United States Patent
Xia et al.

(10) Patent No.: US 9,634,751 B2
(45) Date of Patent: Apr. 25, 2017

(54) METHOD FOR CONFIGURING CHANNEL STATE INFORMATION REFERENCE SIGNAL, BASE STATION, AND ACCESS POINT

(71) Applicant: Huawei Technologies Co., Ltd., Shenzhen (CN)

(72) Inventors: Liang Xia, Shenzhen (CN); Xiaotao Ren, Beijing (CN); Jingyuan Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 166 days.

(21) Appl. No.: 14/687,657

(22) Filed: Apr. 15, 2015

(65) Prior Publication Data

US 2015/0222347 A1  Aug. 6, 2015

Related U.S. Application Data

(63) Continuation of application No. PCT/CN2012/082973, filed on Oct. 15, 2012.

(51) Int. Cl.
*H04B 7/06* (2006.01)
*H04B 7/024* (2017.01)
(Continued)

(52) U.S. Cl.
CPC .......... *H04B 7/0626* (2013.01); *H04B 7/024* (2013.01); *H04B 7/0456* (2013.01); *H04B 7/066* (2013.01);
(Continued)

(58) Field of Classification Search
None
See application file for complete search history.

(56) References Cited

U.S. PATENT DOCUMENTS

2010/0027456 A1  2/2010  Onggosanusi et al.
2012/0113816 A1*  5/2012  Bhattad .................. H04L 5/0032
                                                   370/246

FOREIGN PATENT DOCUMENTS

CN  102195741 A  9/2011
CN  102255689 A  11/2011
(Continued)

OTHER PUBLICATIONS

LG Electronics, "Considerations on CSI-RS configuration for CoMP," 3GPP TSG RAN WG1 Meeting #69, R1-122298, May 21-25, 2012, 4 pages.

(Continued)

*Primary Examiner* — Huy D Vu
*Assistant Examiner* — Bao G Nguyen
(74) *Attorney, Agent, or Firm* — Slater Matsil, LLP

(57) ABSTRACT

A method for configuring a channel state information reference signal includes dividing access points into a first access point set and a second access point set, configuring a first CSI-RS pilot pattern for a user equipment and allocating the pattern to the first access point set, configuring a second CSI-RS pilot pattern and allocating the pattern to the second access point set, and configuring a third CSI-RS pilot pattern and allocating the pattern to an antenna set formed by a first antenna of a first access point in the first access point set and a first antenna of a first access point in the second access point set; and sending non-zero power CSI-RS configuration information to the user equipment, so that the user equipment measures and reports first downlink channel state information, second downlink channel state information, and third downlink channel state information of the antenna set.

19 Claims, 13 Drawing Sheets

(51) Int. Cl.
*H04B 7/0456* (2017.01)
*H04W 24/10* (2009.01)
*H04W 72/04* (2009.01)
*H04L 5/00* (2006.01)

(52) U.S. Cl.
CPC ......... *H04B 7/0617* (2013.01); *H04B 7/0639* (2013.01); *H04L 5/005* (2013.01); *H04L 5/0048* (2013.01); *H04W 24/10* (2013.01); *H04W 72/042* (2013.01); *H04L 5/0035* (2013.01)

(56) References Cited

FOREIGN PATENT DOCUMENTS

| | | |
|---|---|---|
| CN | 102404689 A | 4/2012 |
| CN | 102684850 A | 9/2012 |
| CN | 102694622 A | 9/2012 |
| WO | 2011100520 A1 | 8/2011 |
| WO | 2011153286 A1 | 12/2011 |
| WO | 2012124551 A1 | 9/2012 |
| WO | 2012124552 A1 | 9/2012 |

OTHER PUBLICATIONS

"Baseline Schemes and Focus of CoMP Studies," 3GPP TSG-RAN WG1 #63bis R1-110461, Ericsson, ST-Ericsson, Jan. 17, 21, 2011, 2 pages.

"Aspects on Distributed RRUs with Shared Cell-ID for Heterogeneous Deployments," 3GPP TSG-RAN WG1 #64 R1-110649, Ericsson, St-Ericsson, Feb. 21-25, 2011, 11 pages.

\* cited by examiner

|   | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
|   |   |   |   |   |   |   |   |   |   | A0 | A1 |   |   |   |
|   |   |   |   |   |   |   |   |   |   | C0 | C1 |   |   |   |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |

FIG. 4A

|    | 0 | 1 | 2 | 3 | 4 | 5 | 6 | 7 | 8 | 9 | 10 | 11 | 12 | 13 |
|----|---|---|---|---|---|---|---|---|---|---|----|----|----|----|
|    |   |   |   |   |   |   |   |   |   |   |    |    |    |    |
|    |   |   |   |   |   |   |   |   |   |   |    |    |    |    |
|    |   |   |   |   |   |   |   |   |   |   |    |    |    |    |
|    |   |   |   |   |   |   |   |   |   |   |    |    |    |    |
|    |   |   |   |   |   |   |   |   |   |   |    |    |    |    |
|    |   |   |   |   |   |   |   |   |   |   |    |    |    |    |
|    |   |   |   |   |   |   |   |   |   | A2| A3 |    |    |    |
|    |   |   |   |   |   |   |   |   |   |   |    |    |    |    |
|    |   |   |   |   |   |   |   |   |   |   |    |    |    |    |
|    |   |   |   |   |   |   |   |   |   |   |    |    |    |    |
|    |   |   |   |   |   |   |   |   |   |   |    |    |    |    |
|    |   |   |   |   |   |   |   |   |   |   |    |    |    |    |

METHOD FOR CONFIGURING CHANNEL STATE INFORMATION REFERENCE SIGNAL, BASE STATION, AND ACCESS POINT

This application is a continuation of International Application No. PCT/CN2012/082973, filed on Oct. 15, 2012, which is hereby incorporated by reference in its entirety.

TECHNICAL FIELD

The present invention relates to a wireless communications technology, and in particular, to a method for configuring a channel state information reference signal, a base station, and an access point.

BACKGROUND

In a wireless communication system, in order to enable a user equipment (UE for short hereinafter) to measure downlink channel state information (CSI for short hereinafter), a base station needs to send a certain reference signal to a UE in the area covered by the base station for measurement of a downlink channel. For example, in the 3rd Generation Partnership Project (3GPP for short hereinafter) long term evolution (LTE for short hereinafter) release 10 protocol, the base station needs to send a channel state information reference signal (CSI-RS for short hereinafter) to the UE in the area covered by the base station to perform measurement of the downlink channel. At this time, the base station needs to notify the UE of CSI-RS configuration information, so that the UE can measure the downlink channel state information according to the reference signal indicated by the configuration information.

In the LTE R10 protocol, the CSI-RS configuration information includes a pilot pattern, which indicates a location of a resource element (RE for short hereinafter) occupied by the CSI-RS in a resource block pair (RB pair for short hereinafter). Each RB pair has multiple different candidate pilot patterns. For example, for a normal cyclic prefix, there are eight types of 8-port CSI-RS candidate pilot patterns, and each candidate pilot pattern occupies 8 REs; and each 4-port CSI-RS candidate pilot pattern is a half of an 8-port CSI-RS candidate pilot pattern, namely, there are sixteen types of 4-port CSI-RS candidate pilot patterns, and each 4-port CSI-RS occupies 4 REs. Similarly, each 2-port CSI-RS candidate pilot pattern is a half of a 4-port CSI-RS candidate pilot pattern. In addition, the CSI-RS configuration information further includes a cycle and a subframe offset, which indicate a location of a subframe that sends the CSI-RS.

In order to achieve higher user throughput, a coordinated multiple point transmission and reception (CoMP for short hereinafter) technology may be adopted in the communication system. The coordinated multiple point transmission and reception technology refers to that: multiple access points provide data services for one or more users concurrently. For the coordinated multiple point transmission and reception technology, the base station needs to use channel state information between a terminal and a candidate access point or a set as an input or reference to complete processes of resource allocation and data transmission.

In the 3GPP LTE Release 10 protocol, a method for feeding back downlink channel state information is that: The terminal selects an optimal code word from a defined codebook, and feeds back a sequence number (that is, Precoding Matrix Indicator, PMI for short hereinafter) of the code word in the codebook, where the code word may reflect the downlink channel state information. For a multi-point transmission system, the terminal needs to feed back channel state information among multiple service points. For the multi-point transmission system of joint transmission (JT for short hereinafter), the terminal needs to feed back channel state information of multiple joint cells. A CoMP property is added to the 3GPP LTE Release 11 protocol, which is an advanced release of the 3GPP LTE Release 10 protocol. Different from the LTE Release 10 protocol where the base station can only configure one CSI-RS for the UE at most, in the LTE Release 11 protocol, the base station may configure three CSI-RSs for the UE at most, so that the UE can measure the CSI of multiple cells, but the UE cannot directly measure and feed back channel adjustment information among the cells. Therefore, a new solution needs to be designed for the base station and UE in the LTE Release 11, to implement measurement and feedback of the channel state information of the multiple joint cells.

SUMMARY

Embodiments of the present invention provide a method for configuring a channel state information reference signal, a base station, and an access point, to implement measurement of joint downlink channel state information in an application scenario where multiple access points serve a UE.

According to a first aspect, an embodiment of the present invention provides a method for configuring a channel state information reference signal, including: dividing multiple access points of coordinated transmission into a first access point set and a second access point set, where the first access point set includes M access points, and the second access point set includes N access points; configuring a first channel state information reference signal CSI-RS pilot pattern, a second CSI-RS pilot pattern, and a third CSI-RS pilot pattern for a user equipment UE, where the first CSI-RS pilot pattern is an X-port CSI-RS pilot pattern, the X-port CSI-RS pilot pattern includes M CSI-RS pilot patterns which respectively have a port number of Jm, Jm is an antenna port number of an $m^{th}$ access point in the first access point set, m=1, . . . M, and X is a sum of antenna port numbers of the M access points in the first access point set; the second CSI-RS pilot pattern is a Y-port CSI-RS pilot pattern, the Y-port CSI-RS pilot pattern includes N CSI-RS pilot patterns which respectively have a port number of Gn, Gn is an antenna port number of an $n^{th}$ access point in the second access point set, n=1, . . . N, and Y is a sum of antenna port numbers of the N access points in the second access point set; and the third CSI-RS pilot pattern is a 2-port CSI-RS pilot pattern, which includes a CSI-RS pilot pattern with a port number of 2; respectively configuring the first CSI-RS pilot pattern, the second CSI-RS pilot pattern, and the third CSI-RS pilot pattern to the first access point set, the second access point set, and an antenna set formed by a first antenna of the first access point set and a first antenna of the second access point set, so that each access point in the first access point set sends a first non-zero power CSI-RS according to the first CSI-RS pilot pattern, each access point in the second access point set sends a second non-zero power CSI-RS according to the second CSI-RS pilot pattern, and the antenna set sends a third non-zero power CSI-RS according to the third CSI-RS pilot pattern; sending non-zero power CSI-RS configuration information to the UE, where the configuration information includes the first CSI-RS pilot pattern, the second CSI-RS pilot pattern, and the third CSI-RS pilot pattern, so that the UE measures and reports first downlink channel state information according to the first CSI-RS pilot pattern, measures and reports second downlink channel state information according to the second CSI-RS pilot pattern, and measures and reports third downlink channel state information according to the third CSI-RS pilot pattern; and generating joint downlink channel state information according to the first downlink channel state information, the second downlink channel state information, and the third downlink channel state information, which are reported by the UE.

In a first possible implementation manner, the generating joint downlink channel state information according to the first downlink channel state information, the second downlink channel state information, and the third downlink channel state information, which are reported by the UE, includes: respectively obtaining a first precoding matrix of the first downlink channel state information, a second precoding matrix of the second downlink channel state information, and a third precoding matrix of the third downlink channel state information according to the first downlink channel state information, the second downlink channel state information, and the third downlink channel state information, which are reported by the UE; determining first rank indication information of the first downlink channel state information and second rank indication information of the second downlink channel state information; and generating a joint precoding matrix of the joint downlink channel state information according to the first precoding matrix, the second precoding matrix, the third precoding matrix, the first rank indication information, and the second rank indication information.

With reference to a first possible implementation manner of the first aspect, in a second possible implementation manner, the generating a joint precoding matrix of the joint downlink channel state information according to the first precoding matrix, the second precoding matrix, the third precoding matrix, the first rank indication information, and the second rank indication information specifically is: using a minimum value of the first rank indication information and the second rank indication information as joint rank indication information of the joint downlink channel state information, and applying the following formula to calculate the joint precoding matrix $P_{joint}$ of the joint downlink channel state information: performing, by using an interference source analysis model, frequency domain correlation analysis for data collected in a frequency domain, so as to obtain a frequency domain correlation analysis result;

$$P_{joint} \begin{bmatrix} p_{31} \times P1(:, 1:RI_{joint}) \\ p_{32} \times P2(:, 1:RI_{joint}) \end{bmatrix};$$

where $P1(:,1:RI_{joint})$ denotes column 1 to column $RI_{joint}$ of the first precoding matrix P1, $P2(:,1:RI_{joint})$ denotes column 1 to column $RI_{joint}$ of the second precoding matrix P2, and $p_{31}$ and $p_{32}$ respectively denote two elements of the third precoding matrix P3.

In a third possible implementation manner, the respectively configuring the first CSI-RS pilot pattern, the second CSI-RS pilot pattern, and the third CSI-RS pilot pattern to the first access point set, the second access point set, and an antenna set formed by a first antenna of the first access point set and a first antenna of the second access point set, specifically is: respectively configuring a CSI-RS pilot pattern with a port number of Jm to an $m^{th}$ access point in the first access point set, configuring a CSI-RS pilot pattern with a port number of Gn to an $n^{th}$ access point in the second access point set, and configuring a CSI-RS pilot pattern with a port number of 2 to the first antenna of the first access point set and a first antenna of the second access point set, so that the $m^{th}$ access point in the first access point set sends the first non-zero power CSI-RS on the CSI-RS pilot pattern with the port number of Jm, the $n^{th}$ access point in the second access point set sends the second non-zero power CSI-RS on the CSI-RS pilot pattern with the port number of Gn, and the first antenna of the first access point set and the first antenna of the second access point set send the third non-zero power CSI-RS on the 2-port CSI-RS pilot pattern.

With reference to the third possible implementation manner of the first aspect, in a fourth possible implementation manner, after the configuring the first CSI-RS pilot pattern, the second CSI-RS pilot pattern, and the third CSI-RS pilot pattern for the UE, the method further includes notifying the $m^{th}$ access point in the first access point set of a CSI-RS pilot pattern that corresponds to an $x^{th}$ access point in the first access point set and has a port number of Jx, so that the $m^{th}$ access point sends a zero power CSI-RS on the CSI-RS pilot pattern with the port number of Jx, where x≠m.

With reference to the third possible implementation manner of the first aspect, in a fifth possible implementation manner, after the configuring the first CSI-RS pilot pattern, the second CSI-RS pilot pattern, and the third CSI-RS pilot pattern for the UE, the method further includes notifying the $n^{th}$ access point in the second access point set of a CSI-RS pilot pattern that corresponds to a $y^{th}$ access point in the second access point set and has a port number of Gy, so that the $n^{th}$ access point sends a zero power CSI-RS on the CSI-RS pilot pattern with the port number of Gy, where y≠n.

With reference to the first possible implementation manner of the first aspect, in a six$^{th}$ possible implementation manner, the UE is notified of at least one of a mapping between ports of the first CSI-RS pilot pattern and elements of the first precoding matrix, a mapping between ports of the second CSI-RS pilot pattern and elements of the second precoding matrix, and a mapping between ports of the third CSI-RS pilot pattern and elements of the third precoding matrix.

In a seven$^{th}$ possible implementation manner, a cycle of the second CSI-RS pilot pattern is larger than a cycle of the first CSI-RS pilot pattern and/or a cycle of the third CSI-RS pilot pattern.

With reference to the first possible implementation manner to the seven$^{th}$ possible implementation manner of the first aspect, in an eighth possible implementation manner, the access points are physical access points or virtual access points, the antennas are physical antennas or virtual antennas, and the antenna ports are physical antenna ports or virtual antenna ports.

According to a second aspect, an embodiment of the present invention provides a method for configuring a channel state information reference signal, including: obtaining, by an access point, a CSI-RS pilot pattern configured by a base station to the access point, where the CSI-RS pilot pattern is one of a first CSI-RS pilot pattern, a second CSI-RS pilot pattern, or a third CSI-RS pilot pattern, which are configured by the base station for a user equipment UE, the first CSI-RS pilot pattern is an X-port CSI-RS pilot pattern, the X-port CSI-RS pilot pattern includes M CSI-RS pilot patterns which respectively have a port number of Jm, Jm is an antenna port number of an $m^{th}$ access point in the first access point set, m=1, . . . M, and X is a sum of antenna port numbers of M access points in the first access point set; the second CSI-RS pilot pattern is a Y-port CSI-RS pilot pattern, the Y-port CSI-RS pilot pattern includes N CSI-RS pilot patterns which respectively have a port number of Gn, Gn is an antenna port number of an $n^{th}$ access point in the second access point set, n=1, . . . N, and Y is a sum of antenna port numbers of N access points in the second access point set; and the third CSI-RS pilot pattern is a 2-port CSI-RS pilot pattern, which includes a CSI-RS pilot pattern with a port number of 2; and sending, by the access point, a non-zero power CSI-RS according to the CSI-RS pilot pattern.

According to a third aspect, an embodiment of the present invention provides a base station, including: a division unit, adapted to divide multiple access points of coordinated transmission into a first access point set and a second access point set, where the first access point set includes M access points, and the second access point set includes N access points; a first configuration unit, connected to the division unit, adapted to configure a first channel state information reference signal CSI-RS pilot pattern, a second CSI-RS pilot pattern, and a third CSI-RS pilot pattern for a user equipment UE, where the first CSI-RS pilot pattern is an X-port CSI-RS pilot pattern, the X-port CSI-RS pilot pattern includes M CSI-RS pilot patterns which respectively have a port number of Jm, Jm is an antenna port number of an $m^{th}$ access point in the first access point set, m=1, . . . M, and X is a sum of antenna port numbers of the M access points in the first access point set; the second CSI-RS pilot pattern is a Y-port CSI-RS pilot pattern, the Y-port CSI-RS pilot pattern includes N CSI-RS pilot patterns which respectively have a port number of Gn, Gn is an antenna port number of an $n^{th}$ access point in the second access point set, n=1, . . . N, and Y is a sum of antenna port numbers of the N access points in the second access point set; and the third CSI-RS pilot pattern is a 2-port CSI-RS pilot pattern, which includes a CSI-RS pilot pattern with a port number of 2; a second configuration unit, connected to the first configuration unit, adapted to respectively configure the first CSI-RS pilot pattern, the second CSI-RS pilot pattern, and the third CSI-RS pilot pattern to the first access point set, the second access point set, and an antenna set formed by a first antenna of the first access point set and a first antenna of the second access point set, so that each access point in the first access point set sends a first non-zero power CSI-RS according to the first CSI-RS pilot pattern, each access point in the second access point set sends a second non-zero power CSI-RS according to the second CSI-RS pilot pattern, and the antenna set sends a third non-zero power CSI-RS according to the third CSI-RS pilot pattern; a configuration information sending unit, adapted to send non-zero power CSI-RS configuration information to the UE, where the configuration information includes the first CSI-RS pilot pattern, the second CSI-RS pilot pattern, and the third CSI-RS pilot pattern, so that the UE measures and reports first downlink channel state information according to the first CSI-RS pilot pattern, measures and reports second downlink channel state information according to the second CSI-RS pilot pattern, and measures and reports third downlink channel state information according to the third CSI-RS pilot pattern; and a processing unit, adapted to generate joint downlink channel state information according to the first downlink channel state information, the second downlink channel state information, and the third downlink channel state information, which are reported by the UE.

In a first possible implementation manner, the processing unit includes a first processing sub-unit, adapted to respectively obtain a first precoding matrix of the first downlink channel state information, a second precoding matrix of the second downlink channel state information, and a third precoding matrix of the third downlink channel state information according to the first downlink channel state information, the second downlink channel state information, and the third downlink channel state information, which are reported by the UE; a second processing sub-unit, adapted to determine first rank indication information of the first downlink channel state information and second rank indication information of the second downlink channel state information; and a third processing sub-unit, respectively connected to the first processing sub-unit and the second processing sub-unit, adapted to generate a joint precoding matrix of the joint downlink channel state information according to the first precoding matrix, the second precoding matrix, the third precoding matrix, the first rank indication information, and the second rank indication information.

With reference to the first possible implementation manner of the third aspect, in a second possible implementation manner, the third processing sub-unit is specifically adapted to use a minimum value of the first rank indication information and the second rank indication information as joint rank indication information of the joint downlink channel state information, and apply the following formula to calculate the joint precoding matrix $P_{joint}$ of the joint downlink channel state information:

$$P_{joint}\begin{bmatrix} p_{31} \times P1(:,1:RI_{joint}) \\ p_{32} \times P2(:,1:RI_{joint}) \end{bmatrix};$$

where $P1(:,1:RI_{joint})$ denotes column 1 to column $RI_{joint}$ of the first precoding matrix P1, $P2(:,1:RI_{joint})$ denotes column 1 to column $RI_{joint}$ of the second precoding matrix P2, and $p_{31}$ and $p_{32}$ respectively denote two elements of the third precoding matrix P3.

In a third possible implementation manner, the second configuration unit is specifically adapted to respectively configure a CSI-RS pilot pattern with a port number of Jm to an $m^{th}$ access point in the first access point set, configure a CSI-RS pilot pattern with a port number of Gn to an $n^{th}$ access point in the second access point set, and configure a CSI-RS pilot pattern with a port of 2 to the first antenna of the first access point set and a second antenna of the second access point set, so that the $m^{th}$ access point in the first access point set sends the first non-zero power CSI-RS on the CSI-RS pilot pattern with the port number of Jm, the $n^{th}$ access point in the second access point set sends the second non-zero power CSI-RS on the CSI-RS pilot pattern with the port number of Gn, and the first antenna of the first access point set and the first antenna of the second access point set send the third non-zero power CSI-RS on the 2-port CSI-RS pilot pattern.

With reference to the third possible implementation manner of the third aspect, in a fourth possible implementation manner, the base station further includes a first notification unit, connected to the first configuration unit, adapted to notify the $m^{th}$ access point in the first access point set of a CSI-RS pilot pattern that corresponds to an $x^{th}$ access point in the first access point set and has a port number of Jx, so that the $m^{th}$ access point sends a zero power CSI-RS on the CSI-RS pilot pattern with the port number of Jx, where x≠m.

With reference to the third possible implementation manner of the third aspect, in a fifth possible implementation manner, the base station further includes a second notification unit, connected to the second configuration unit, adapted to notify the $n^{th}$ access point in the second access point set of a CSI-RS pilot pattern that corresponds to a $y^{th}$ access point in the second access point set and has a port number of Gy, so that the $n^{th}$ access point sends a zero power CSI-RS on the CSI-RS pilot pattern with the port number of Gy, where y≠n.

With reference to the first possible implementation manner of the third aspect, in a $six^{th}$ possible implementation manner, the base station further includes a third notification unit, adapted to notify the UE of at least one of a mapping between ports of the first CSI-RS pilot pattern and elements of the first precoding matrix, a mapping between ports of the second CSI-RS pilot pattern and elements of the second precoding matrix, and a mapping between ports of the third CSI-RS pilot pattern and elements of the third precoding matrix.

In a $seven^{th}$ possible implementation manner, a cycle of the second CSI-RS pilot pattern is larger than a cycle of the first CSI-RS pilot pattern and/or a cycle of the third CSI-RS pilot pattern.

With reference to the first possible implementation manner to the $seven^{th}$ possible implementation manner of the third aspect, in an eighth possible implementation manner, the access points are physical access points or virtual access points, the antennas are physical antennas or virtual antennas, and the antenna ports are physical antenna ports or virtual antenna ports.

According to a fourth aspect, an embodiment of the present invention provides an access point, including: an obtaining unit, adapted to obtain a CSI-RS pilot pattern configured by a base station to the access point, where the CSI-RS pilot pattern is one of a first CSI-RS pilot pattern, a second CSI-RS pilot pattern, or a third CSI-RS pilot pattern, which are configured by the base station for a user equipment UE, the CSI-RS pilot pattern is an X-port CSI-RS pilot pattern, the X-port CSI-RS pilot pattern includes M CSI-RS pilot patterns which respectively have a port number of Jm, Jm is an antenna port number of an $m^{th}$ access point in the first access point set, m=1, . . . M, and X is a sum of antenna port numbers of M access points in the first access point set; the second CSI-RS pilot pattern is a Y-port CSI-RS pilot pattern, the Y-port CSI-RS pilot pattern includes N CSI-RS pilot patterns which respectively have a port number of Gn, Gn is an antenna port number of an $n^{th}$ access point in the second access point set, n=1, . . . N, and Y is a sum of port numbers of N access points in the second access point set; and the third CSI-RS pilot pattern is a 2-port CSI-RS pilot pattern, which includes a CSI-RS pilot pattern with a port number of 2; and a sending unit, connected to the obtaining unit, adapted to send a non-zero power CSI-RS according to the CSI-RS pilot pattern.

It can be known from the above technical solutions that, in the method for configuring a channel state information reference signal, the base station, and the access point provided by the embodiments of the present invention, access points that serve a UE are divided into a first access point set and a second access point set, the first CSI-RS pilot pattern is configured for the UE, and is allocated to the first access point set, the second CSI-RS pilot pattern is configured, and is allocated to the second access point set; the third CSI-RS pilot pattern is configured, and is allocated to an antenna set formed by a first antenna of a first access point in the first access point set and a first antenna of a first access point in the second access point set, so that each access point sends a non-zero power on respective pilot patterns. The base station or a network side device sends non-zero power CSI-RS configuration information to the UE, so that the UE obtains corresponding CSI-RS information, measures and reports first downlink channel state information of the first access point set, second downlink channel state information of the second access point set, and third downlink channel state information of the antenna set. The base station obtains joint downlink channel state information according to the downlink channel state information. The first access point set includes at least one access point, and the second access point set includes at least two access points. Therefore, in the method for configuring a channel state information reference signal, the base station, and the access point provided by the embodiments of the present invention, the UE can measure joint downlink channel state information of at least three access points.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 4A is a schematic diagram of a CSI-RS pilot pattern of a physical access point 1 of the joint multi-point transmission system to which the method of the present invention is applied;

FIG. 4B is a schematic diagram of a CSI-RS pilot pattern of a physical access point 2 of the joint multi-point transmission system to which the method of the present invention is applied;

FIG. 4C is a schematic diagram of a CSI-RS pilot pattern of a physical access point 3 of the joint multi-point transmission system to which the method of the present invention is applied;

FIG. 4D is a schematic diagram of a CSI-RS pilot pattern of a physical access point 4 of the joint multi-point transmission system to which the method of the present invention is applied;

FIG. 4E is a schematic diagram of a CSI-RS pilot pattern of a physical access point 5 of the joint multi-point transmission system to which the method of the present invention is applied;

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
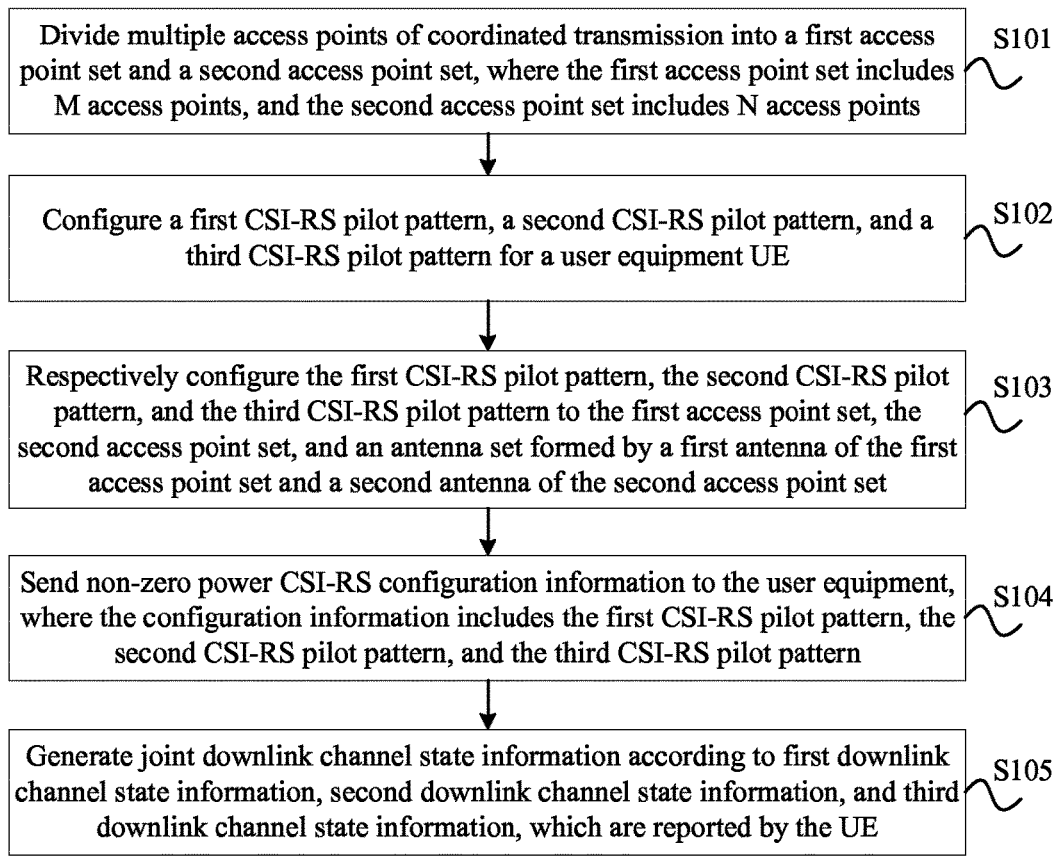
FIG. 1 is a schematic flowchart of a method for configuring a channel state information reference signal according to Embodiment 1 of the present invention.

FIG. 1 is a schematic flowchart of a method for configuring a channel state information reference signal according to Embodiment 1 of the present invention. As shown in FIG. 1, the method for configuring a channel state information reference signal CSI-RS provided by this embodiment is specifically applicable to a CSI-RS configuration process in a communication system that adopts a CoMP technology. In the communication system, multiple access points provide data services for one UE concurrently, and the multiple access points are the access points of coordinated transmission.

The method for configuring a channel state information reference signal CSI-RS provided by this embodiment specifically includes the following steps.

Step S101: Divide multiple access points of coordinated transmission into a first access point set and a second access point set, where the first access point set includes M access points, and the second access point set includes N access points.

Specifically, the access point may be a cell (specifically is a network side device that covers an area of the cell), or a base station corresponding to the cell, a remote radio head (RRH for short hereinafter), a radio remote unit (Radio Remote Unit, RRU for short hereinafter), or an antenna unit (AU for short hereinafter). The base station divides the access points into the first access point set and the second access point set.

The M (M≥1) access points included in the first access point set may be service access points of a user equipment UE, access points for receiving control information, access points for receiving broadcast information, or M access points of received strongest signals, and may also be M access points configured by the base station.

The N (N≥1) access points included in the second access point set may be access points except the access points included in the first access point set.

Step S102: Configure a first CSI-RS pilot pattern, a second CSI-RS pilot pattern, and a third CSI-RS pilot pattern for the UE.

The first CSI-RS pilot pattern is an X-port CSI-RS pilot pattern, the X-port CSI-RS pilot pattern includes M CSI-RS pilot patterns which respectively have a port number of Jm, Jm is an antenna port number of an $m^{th}$ access point in the first access point set, m=1, . . . M, and X is a sum of antenna port numbers of the M access points in the first access point set. The second CSI-RS pilot pattern is a Y-port CSI-RS pilot pattern, the Y-port CSI-RS pilot pattern includes N CSI-RS pilot patterns which respectively have a port number of Gn, Gn is an antenna port number of an $n^{th}$ access point in the second access point set, n=1, . . . N, and Y is a sum of antenna port numbers of the N access points in the second access point set. The third CSI-RS pilot pattern is a 2-port CSI-RS pilot pattern, which includes a CSI-RS pilot pattern with a port number of 2.

Specifically, the base station configures the first CSI-RS pilot pattern, the second CSI-RS pilot pattern, and the third CSI-RS pilot pattern for the UE.

The first access point set includes at least one access point, and the second access point set includes at least two access points. Generally, the antenna port number of each access point should be 1, 2, 4, or 8. It is assumed that there is only one access point in the first access point set, and that the antenna port number of the access point is 4, the above X is 4. That is, the base station or a network side entity configures a 4-port CSI-RS pilot pattern to the first access point set for the UE. It is assumed that the second access point set includes two access points, and that the antenna port number of each access point is 4, the above Y is 8. That is, the base station configures an 8-port CSI-RS pilot pattern to the second access point set for the UE. The 8-port CSI-RS pattern includes two 4-port CSI-RS pilot patterns. The base station further configures a third CSI-RS pilot pattern to a first antenna port of a first access point in the first access point set and a first antenna port of a first access point in the second access point set for the UE. The third CSI-RS pilot pattern includes a CSI-RS pilot pattern with an antenna port of 2, which corresponds to the first antenna of the first access point set and the first antenna of the second access point set. The first antenna of the first access point set and the first antenna of the second access point set are determined according to a preset rule.

Step S103: Respectively configure the first CSI-RS pilot pattern, the second CSI-RS pilot pattern, and the third CSI-RS pilot pattern to the first access point set, the second access point set, and an antenna set formed by the first antenna of the first access point set and the first antenna of the second access point set, so that each access point in the first access point set sends a first non-zero power CSI-RS according to the first CSI-RS pilot pattern, each access point in the second access point set sends a second non-zero power CSI-RS according to the second CSI-RS pilot pattern, and the antenna set sends a third non-zero power CSI-RS according to the third CSI-RS pilot pattern.

Specifically, the first CSI-RS pilot pattern includes CSI-RS pilot patterns corresponding to all access points in the first access point set, the second CSI-RS pilot pattern includes CSI-RS pilot patterns corresponding to all access points in the second access point set, and the third CSI-RS pilot pattern is a CSI-RS pilot pattern respectively corresponding to the antenna set formed by the first antenna of the first access point set and the first antenna of the second access point set. The CSI-RS pilot patterns corresponding to all access points in the first access point set are respectively configured to all the access points in the first access point set, the CSI-RS pilot patterns corresponding to all access points in the second access point set are respectively configured to all the access points in the second access point set, and the third CSI-RS pilot pattern is configured to the antenna set formed by the first antenna of the first access point set and the first antenna of the second access point set.

After the configuration is completed, each access point in the first access point set sends the first non-zero power CSI-RS according to the respectively configured CSI-RS pilot pattern, each access point in the second access point set sends the second non-zero power CSI-RS according to the respectively configured CSI-RS pilot pattern, and the antenna set sends the third non-zero power CSI-RS according to the third CSI-RS pilot pattern. That is, each access point in the first access point set and the second access point set sends the non-zero power CSI-RS on respective corresponding CSI-RS pilot patterns.

Step S104: Send non-zero power CSI-RS configuration information to the UE, where the configuration information includes the first CSI-RS pilot pattern, the second CSI-RS pilot pattern, and the third CSI-RS pilot pattern, so that the UE measures and reports first downlink channel state information according to the first CSI-RS pilot pattern, measures and reports second downlink channel state information according to the second CSI-RS pilot pattern, and measures and reports third downlink channel state information according to the third CSI-RS pilot pattern.

In a practical application, the CSI-RS configuration information may specifically include:

(1) non-zero power CSI-RS configuration information, which includes information such as an antenna port number, a pilot pattern, a cycle and a subframe offset; and (2) zero power CSI-RS configuration information, which includes information such as an RE location, a cycle and a subframe offset.

The base station sends first non-zero power CSI-RS configuration information to the UE, where the first non-zero power CSI-RS configuration information includes the first CSI-RS pilot pattern, and the UE measures the first downlink channel state information of the first access point set according to the first CSI-RS pilot pattern. The base station sends second non-zero power CSI-RS configuration information to the UE, where the second non-zero power CSI-RS configuration information includes the second CSI-RS pilot pattern, and the UE measures the second downlink channel state information of the second access point set according to the second CSI-RS pilot pattern. The base station sends third non-zero power CSI-RS configuration information to the UE, where the third non-zero power CSI-RS configuration information includes the third CSI-RS pilot pattern, and the UE measures third downlink channel state information of the antenna set formed by the first antenna of the first access point set and the first antenna of the second access point set according to the third CSI-RS pilot pattern.

Step S105: Generate joint downlink channel state information according to the first downlink channel state information, the second downlink channel state information, and the third downlink channel state information, which are reported by the UE.

The joint downlink channel state information can be decomposed into independent downlink channel space information of each access point set, that is, the first downlink channel state information, the second downlink channel state information, and the third downlink channel state information between the access point sets, namely, of the antenna set. Therefore, the base station or the network side entity can generate joint downlink channel state information according to the first downlink channel state information of the first access point set, the second downlink channel state information of the second access point set, and the third downlink channel state information of the antenna set, which are reported by the UE. The first downlink channel state information or the second downlink channel state information is, for example, a PMI or a channel covariance matrix, and the third downlink channel state information is channel adjustment information, for example, phase modulation information or amplitude adjustment information.

In the method for configuring a channel state information reference signal CSI-RS provided by the embodiment of the present invention, a base station divides access points that provide services for a UE into a first access point set and a second access point set, configures a first CSI-RS pilot pattern, a second CSI-RS pilot pattern, and a third CSI-RS pilot pattern for the UE, allocates the patterns to the first access point set, the second access point set, and an antenna set formed by a first antenna of a first access point in the first access point set and a first antenna of a first access point in the second access point set, and sends non-zero power CSI-RS configuration information including the pilot patterns to the UE. The UE measures and reports first downlink channel state information of the first access point set, second downlink channel state information of the second access point set, and third downlink channel state information of the antenna set according to the pilot patterns, so that the base station or a network side entity can obtain joint downlink channel state information according to the first downlink channel state information, the second downlink channel state information, and the third downlink channel state information. The base station configures CSI-RS pilot patterns for multiple access points that are coordinated, so that the UE can measure and report joint downlink channel state information of at least two access points, thereby implementing measurement of joint downlink channel state information in an application scenario where multiple access points serve a UE.

Figure 2:
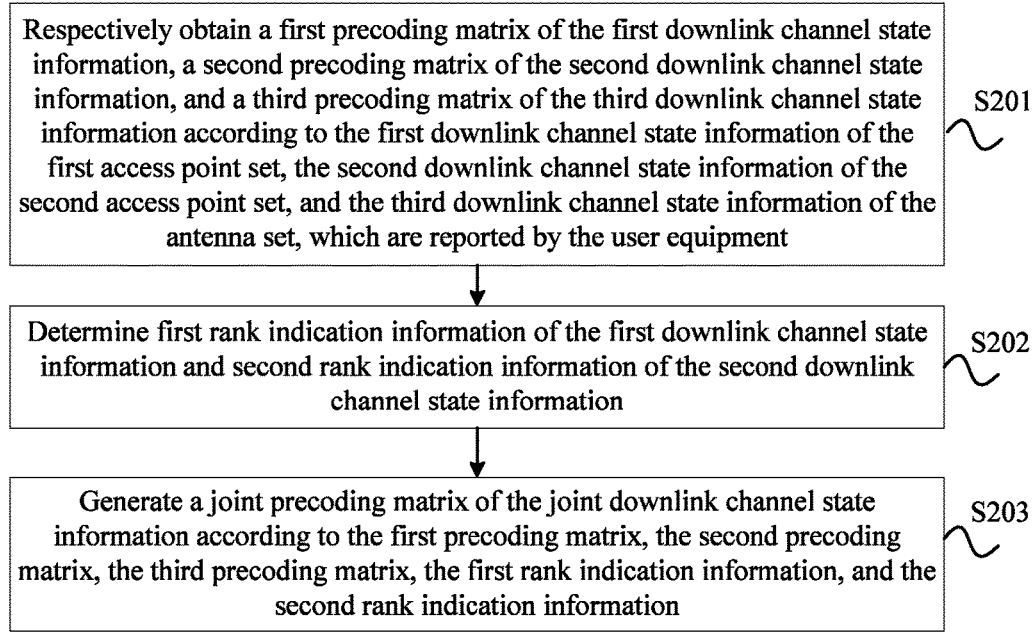
FIG. 2 is a schematic flowchart of a method for configuring a channel state information reference signal according to Embodiment 2 of the present invention.

FIG. 2 is a schematic flowchart of a method for configuring a channel state information reference signal according to Embodiment 2 of the present invention. As shown in FIG. 2, in this embodiment, step S105 of generating joint downlink channel state information according to the first downlink channel state information, the second downlink channel state information, and the third downlink channel state information, which are reported by the user equipment UE may specifically be as follows.

Step S201: The base station obtains a precoding matrix of respective downlink channel state information according to the first downlink channel state information, the second downlink channel state information, and the third downlink channel state information, which are reported by the UE, that is, obtains a first precoding matrix according to the first downlink channel state information, obtains a second precoding matrix according to the second downlink channel state information, and obtains a third precoding matrix according to the third downlink channel state information.

Specifically, each access point in the first access point set sends the first non-zero power CSI-RS on the first CSI-RS pilot pattern, and the base station receives first downlink channel state information of the first access point set, which is measured and reported by the UE, and obtains the first precoding matrix P1 based on the first downlink channel state information. Each access point in the second access point set sends the second non-zero power CSI-RS on the second CSI-RS pilot pattern, and the base station receives second channel state information of the second access point set, which is measured and reported by the UE, and obtains the second precoding matrix P2 based on the second channel state information. The first antenna of the first access point in the first access point set and the first antenna of the first access point in the second access point set send the third non-zero power CSI-RS, and the base station receives third channel state information, which is measured and reported by the UE and is between the first antenna included in the first access point set and the first antenna included in the second access point set, and obtains the third precoding matrix P3 based on the third channel state information. A row number of respective precoding matrices is a sum of antenna port numbers in respective antenna sets, and a column number is a rank indication corresponding to the downlink channel state information.

Step S202: Determine first rank indication information of the first downlink channel state information and second rank indication information of the second downlink channel state information.

Specifically, the first rank indication information and the second rank indication information may be limited to be the same. The rank indication information is used to indicate a layer number of downlink data transmission, that is, the column number of the precoding matrix.

Step S203: Generate a joint precoding matrix of the joint downlink channel state information according to the first precoding matrix, the second precoding matrix, the third precoding matrix, the first rank indication information, and the second rank indication information.

The base station generates the joint precoding matrix of the joint downlink channel state information according to the first precoding matrix, the second precoding matrix, the third precoding matrix, the first rank indication information, and the second rank indication information.

In the method for configuring a channel state information reference signal CSI-RS provided by the embodiment of the present invention, the first precoding matrix is obtained according to the first downlink channel state information, the second precoding matrix is obtained according to the second downlink channel state information, the third precoding matrix is obtained according to the third downlink channel state information, the first rank indication information and the second rank indication information of the second downlink channel state information are determined, and the joint precoding matrix of the joint downlink channel state information is finally determined, to obtain the joint downlink channel state information. The first downlink channel state information is downlink channel state information of the first access point set that includes M (M≥1) access points, the second downlink channel state information is downlink channel state information of the second access point set that includes N (N≥1) access points, and the third downlink channel state information is channel adjustment information between the first access point set and the second access point set. Therefore, the method provided by the embodiment of the present invention may be adopted to implement measurement of joint downlink channel state information of three or more access points.

In the above embodiment, the base station may notify the UE of at least one of a mapping between ports of the first CSI-RS pilot pattern and elements of the first precoding matrix, a mapping between ports of the second CSI-RS pilot pattern and elements of the second precoding matrix, and a mapping between ports of the third CSI-RS pilot pattern and elements of the third precoding matrix, so that the UE can learn, according to the mapping, a mapping between antenna ports of the CSI-RS pilot pattern and antenna ports of a specific access point. For example, the UE can determine the first antenna of the first access point in the first access point set and the first antenna of the first access point in the second access point set according to the mapping between the third CSI-RS pilot pattern and antenna ports.

Step S203 of generating a joint precoding matrix of the joint downlink channel state information according to the first precoding matrix, the second precoding matrix, the third precoding matrix, the first rank indication information, and the second rank indication information may specifically be: using a minimum value of the first rank indication information and the second rank indication information as joint rank indication information of the joint downlink channel state information, and applying the following formula to calculate the joint precoding matrix $P_{joint}$ of the joint downlink channel state information:

$$P_{joint}\begin{bmatrix} p_{31} \times P1(:,1:RI_{joint}) \\ p_{32} \times P2(:,1:RI_{joint}) \end{bmatrix};$$

where $P1(:,1:RI_{joint})$ denotes column 1 to column $RI_{joint}$ of the first precoding matrix P1, $P2(:,1:RI_{joint})$ denotes column 1 to column $RI_{joint}$ of the second precoding matrix P2, and $p_{31}$ and $p_{32}$ respectively denote two elements of the third precoding matrix P3.

Specifically, let the rank indication of the joint downlink channel be $RI_{joint}$=MIN(RI1, RI2), where MIN( ) denotes taking the minimum value.

In Embodiment 3 of a method for configuring a channel state information reference signal CSI-RS according to the present invention, step S103 of respectively configuring the first CSI-RS pilot pattern, the second CSI-RS pilot pattern, and the third CSI-RS pilot pattern to the first access point set, the second access point set, and an antenna set formed by the first antenna of the first access point set and the first antenna of the second access point set specifically may be: respectively configuring a CSI-RS pilot pattern with a port number of Jm to an $m^{th}$ access point in the first access point set, configuring a CSI-RS pilot pattern with a port number of Gn to an $n^{th}$ access point in the second access point set, and configuring a CSI-RS pilot pattern with a port of 2 to the first antenna of the first access point set and a second antenna of the second access point set, so that the $m^{th}$ access point in the first access point set sends the first non-zero power CSI-RS on the CSI-RS pilot pattern with the port number of Jm, the $n^{th}$ access point in the second access point set sends the second non-zero power CSI-RS on the CSI-RS pilot pattern with the port number of Gn, and the first antenna of the first access point set and the first antenna of the second access point set send the third non-zero power CSI-RS on the 2-port CSI-RS pilot pattern.

After the CSI-RS pilot patterns are configured to the access point sets, the access points of each access point set are enabled to send non-zero power CSI-RS on respective CSI-RS pilot patterns. Then, the base station or a network side entity sends configuration information to the UE, so as to obtain the joint downlink channel state information.

Figure 3:
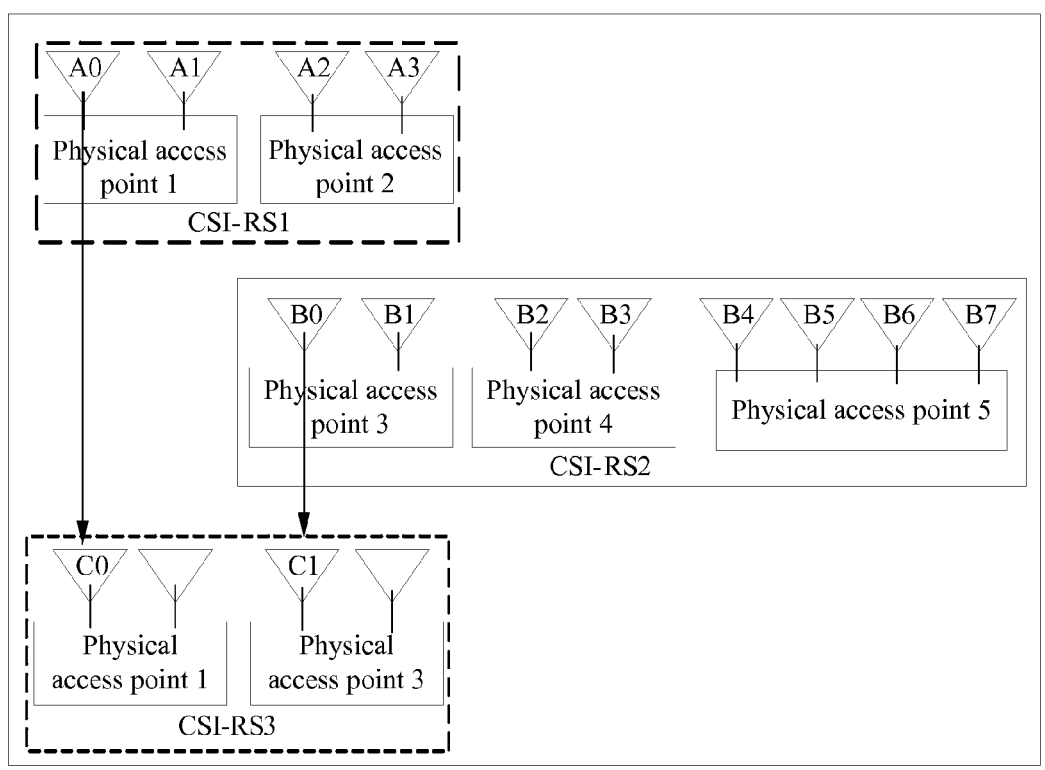
FIG. 3 is a schematic diagram of a first scenario where the method of the present invention is applied to a joint multi-point transmission system.

FIG. 3 is a schematic diagram of a first scenario where the method of the present invention is applied to a joint multi-point transmission system. In this embodiment, access points are physical access points. As shown in FIG. 3, in a joint multi-point transmission system, a base station divides physical access points that serve a user equipment UE into a first access point set and a second access point set. The first access point set includes two physical access points: a physical access point 1 and a physical access point 2. The second access point set includes three physical access points: a physical access point 3, a physical access point 4, and a physical access point 5. The physical access point 1, the physical access point 2, the physical access point 3, and the physical access point 4 include two antenna ports, and the physical access point 5 includes four antenna ports.

Specifically, the base station configures a 4-port first CSI-RS pilot pattern {A0, A1, A2, A3} for the UE. The first CSI-RS pilot pattern includes two 2-port pilot patterns {A0, A1} and {A2, A3}. The base station configures an 8-port second CSI-RS pilot pattern {B0, B1, B2, B3, B4, B5, B6, B7} for the UE. The second CSI-RS pilot pattern includes two 2-port pilot patterns {B0, B1}, {B2, B3} and one 4-port pilot pattern {B4, B5, B6, B7}. The base station configures a 2-port third CSI-RS pilot pattern {C0, C1} for the UE. The third CSI-RS pilot pattern includes a CSI-RS pilot pattern {C0, C1} with a port number of 2.

The base station respectively configures the two 2-port pilot patterns included in the first CSI-RS pilot pattern to antenna ports corresponding to the physical access point 1 and the physical access point 2 in the first access point set; respectively configures the two 2-port pilot patterns included in the second CSI-RS pilot pattern to antenna ports corresponding to the physical access point 3 and the physical access point 4 in the second access point set, configures the 4-port pilot pattern included in the second CSI-RS pilot pattern to antenna ports corresponding to the physical access point 5; and configures the third CSI-RS pilot pattern to a first antenna port of the physical access point 1 in the first access point set and a first antenna port of the physical access point 3 in the second access point set.

Figure 4A:
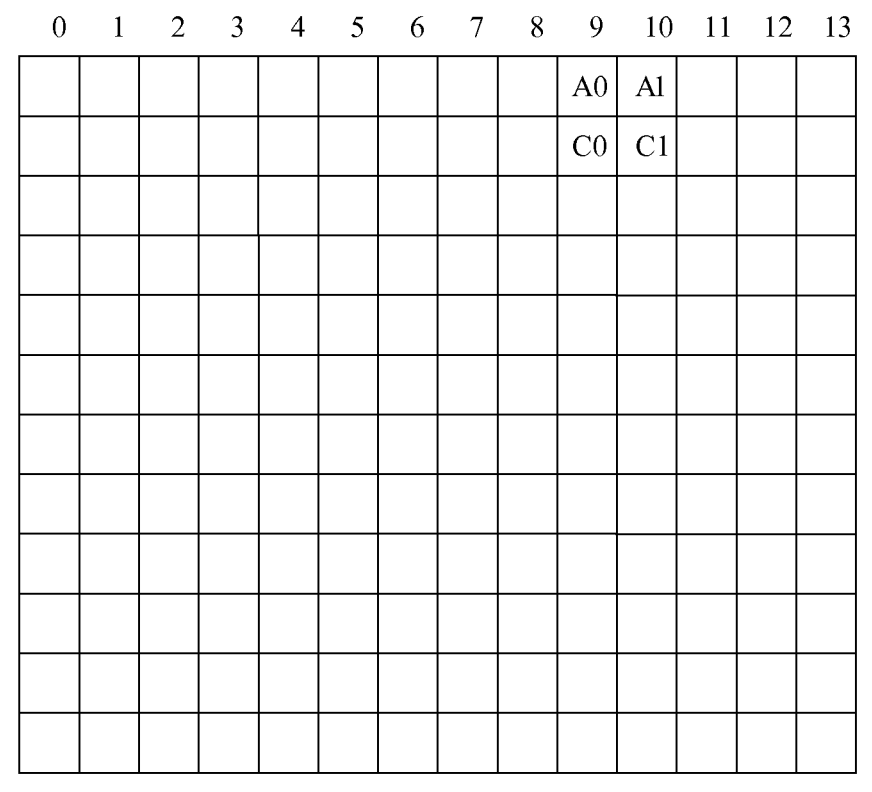
Figure 4B:
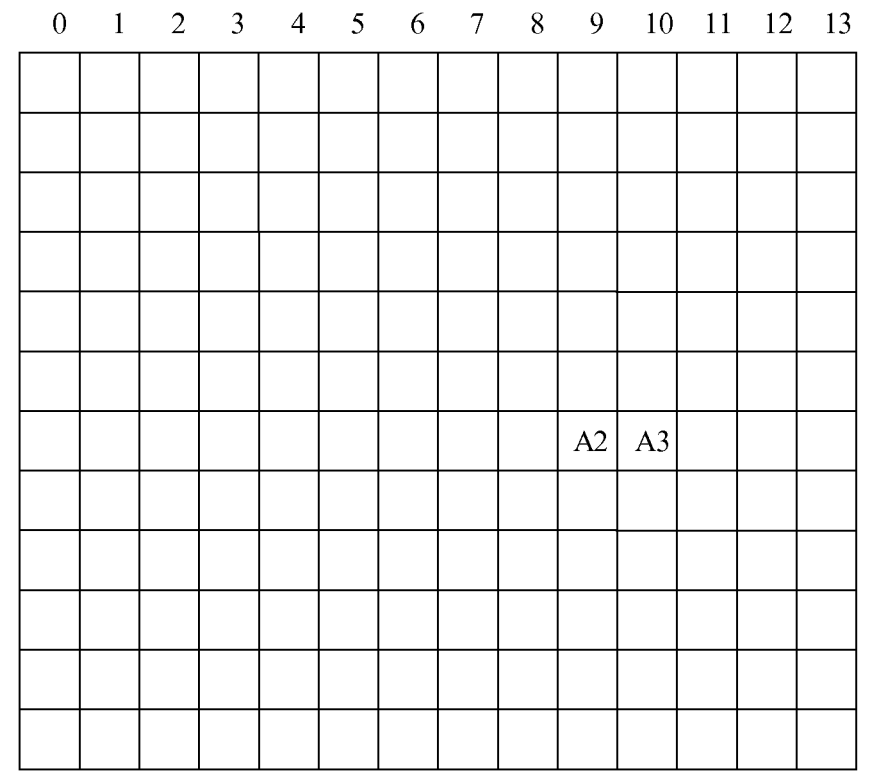
Figure 4C:
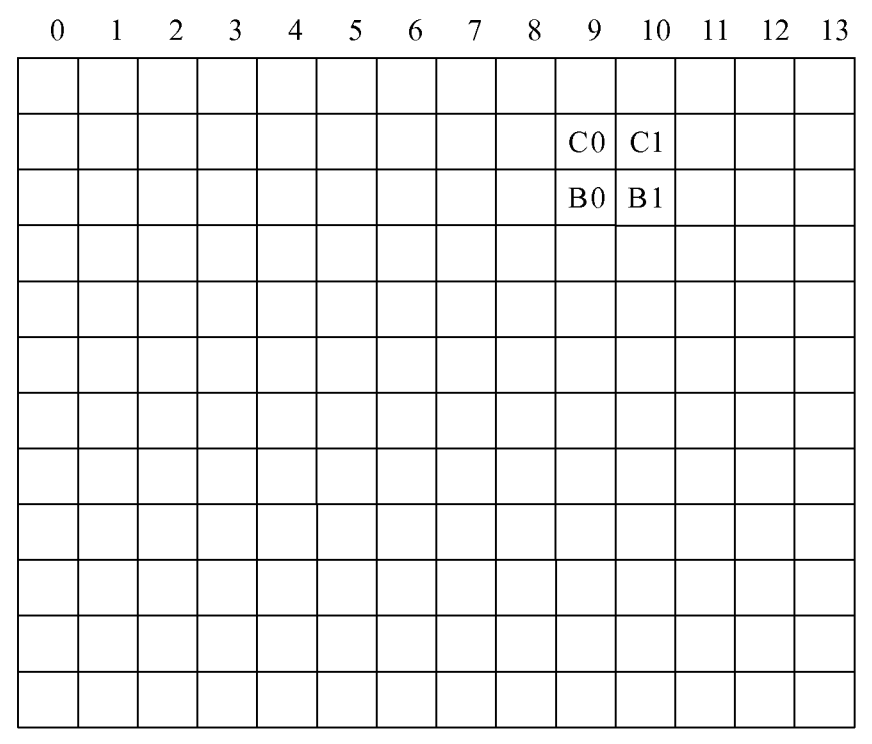
Figure 4D:
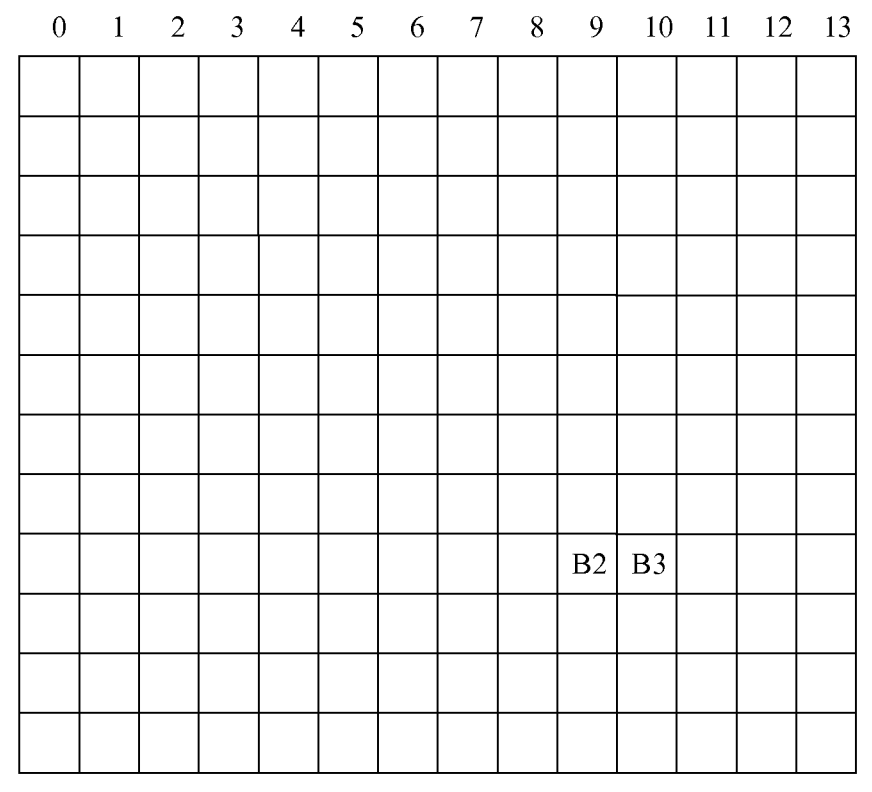
Figure 4E:
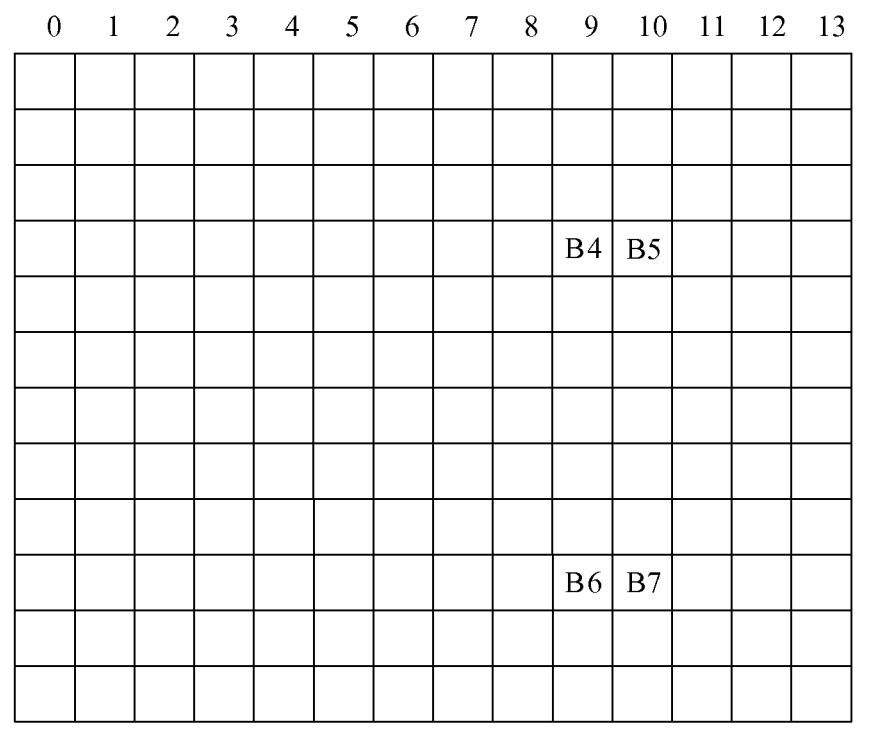

Specifically, refer to FIG. 4A to FIG. 4E. FIG. 4A is a schematic diagram of a CSI-RS pilot pattern of the physical access point 1 of the joint multi-point transmission system to which the method of the present invention is applied; FIG. 4B is a schematic diagram of a CSI-RS pilot pattern of the physical access point 2 of the joint multi-point transmission system to which the method of the present invention is applied; FIG. 4C is a schematic diagram of a CSI-RS pilot pattern of the physical access point 3 of the joint multi-point transmission system to which the method of the present invention is applied; FIG. 4D is a schematic diagram of a CSI-RS pilot pattern of the physical access point 4 of the joint multi-point transmission system to which the method of the present invention is applied; and FIG. 4E is a schematic diagram of a CSI-RS pilot pattern of the physical access point 5 of the joint multi-point transmission system to which the method of the present invention is applied.

As shown in FIG. 4A to FIG. 4E, the first non-zero power CSI-RS is sent on REs (Resource Element, resource element for short hereinafter) labeled as {A0, A1, A2, A3}, the second non-zero power CSI-RS is sent on REs labeled as {B0, B1, B2, B3, B4, B5, B6, B7}, and the third non-zero power CSI-RS is sent on REs labeled as {C0, C1}. Ports of the third non-zero power CSI-RS are mapped to the first antenna of the physical access point 1 included in the first access point set and the first antenna of the physical access point 3 included in the second access point set, and the third non-zero power CSI-RS is sent on the REs labeled as {C0, C1}.

The base station sends non-zero power CSI-RS configuration information to the UE, where the first non-zero power CSI-RS configuration information includes the 4-port pilot pattern {A0, A1, A2, A3}; the second non-zero power CSI-RS configuration information includes the 8-port pilot pattern {B0, B1, B2, B3, B4, B5, B6, B7}; and the third non-zero power CSI-RS configuration information includes the 2-port pilot pattern {C0, C1}. The UE can obtain a corresponding CSI-RS according to the non-zero power CSI-RS configuration information, to measure and report first downlink channel state information of the first access point set, second downlink channel state information of the second access point set, and third downlink channel state information of an antenna set formed by the first antenna of the physical access point 1 in the first access point set and the first antenna of the physical access point 3 in the second access point set, so as to obtain joint downlink channel state information of the physical access point 1, the physical access point 2, the physical access point 3, the physical access point 4, and the physical access point 5.

In this embodiment, the method for configuring a channel state information reference signal CSI-RS is applied to the multi-point transmission system of joint transmission, at least three physical access points are divided into two access point sets, the joint downlink channel state information of the sets and the downlink channel state information of the antenna set formed by the first antennas of the sets are solved, so as to obtain the joint downlink channel state information from the multiple access points to the UE.

In order to reduce interference on the non-zero power CSI-RS of another access point, in Embodiment 4 of a method for configuring a channel state information reference signal CSI-RS provided by an embodiment of the present invention, after configuring the first CSI-RS pilot pattern, the second CSI-RS pilot pattern, and the third CSI-RS pilot pattern for the UE, the base station may notify the $m^{th}$ access point in the first access point set of a CSI-RS pilot pattern that corresponds to an $x^{th}$ access point in the first access point set and has a port number of Jx, so that the $m^{th}$ access point sends a zero power CSI-RS on the CSI-RS pilot pattern with the port number of Jx, where interference exists between the $x^{th}$ access point and the $m^{th}$ access point, and x≠m; or, notify an $n^{th}$ access point in the second access point set of a CSI-RS pilot pattern that corresponds to a $y^{th}$ access point in the second access point set and has a port number of Gy, so that the $n^{th}$ access point sends a zero power CSI-RS on the CSI-RS pilot pattern with the port number of Gy, where interference exists between the $y^{th}$ access point and the $n^{th}$ access point, and y≠n.

Referring to FIG. 4A and FIG. 4B, the base station may notify the physical access point 2 of the CSI-RS pilot pattern {A0, A1}, which has a port number of 2 and corresponds to the access point 1, so that the physical access point 2 sends a zero power CSI-RS on the pilot pattern {A0, A1} which has the port number of 2; or, the base station may notify the physical access point 2 of the CSI-RS pilot pattern {A2, A3}, which has a port number of 2 and corresponds to the physical access point 2, so that the physical access point 1 sends a zero power CSI-RS on the pilot pattern {A2, A3} which has the port number of 2.

Similarly, refer to FIG. 4C and FIG. 4E for the second access point set. The base station may notify the physical access point 4 and the physical access point 5 of the CSI-RS pilot pattern {B0, B1}, which has a port number of 2 and corresponds to the physical access point 3, so that the physical access point 4 and the physical access point 5 send a zero power CSI-RS on the pilot pattern {B0, B1} which has the port number of 2; or, the base station may notify the physical access point 3 and the physical access point 5 of the CSI-RS pilot pattern {B2, B3}, which has a port number of 2 and corresponds to the physical access point 4, so that the physical access point 3 and the physical access point 5 send a zero power CSI-RS on the pilot pattern {B2, B3} which has the port number of 2; or, the base station may notify the physical access point 3 and the physical access point 4 of the CSI-RS pilot pattern {B4, B5, B6, B7}, which has a port number of 4 and corresponds to the physical access point 5, so that the physical access point 3 and the physical access point 4 send a zero power CSI-RS on the pilot pattern {B4, B5, B6, B7} which has the port number of 4.

It should be noted that, the pilot patterns shown in FIG. 4A to FIG. 4E are merely exemplary, and allocation may be performed in another manner. For example, {A0, A1} is allocated to the physical access point 2, and {A2, A3} is allocated to the physical access point 1.

In the above embodiment of the present invention, a cycle of the second CSI-RS pilot pattern is larger than a cycle of the first CSI-RS pilot pattern and/or a cycle of the third CSI-RS pilot pattern.

Since the access points in the second access point set are coordinated access points except the access points in the first access point set, in the non-zero power CSI-RS configuration information sent by the base station to the UE, the cycle of the second CSI-RS pilot pattern is larger than the cycle of the first CSI-RS pilot pattern and/or the cycle of the third CSI-RS pilot pattern, to lower an overhead of the CSI-RS.

In the method for configuring a channel state information reference signal CSI-RS provided by the embodiment of the present invention, a base station configures CSI-RS pilot patterns for multiple access points that are coordinated, so that a UE can measure and report joint downlink channel state information of at least three access points.

Figure 5:
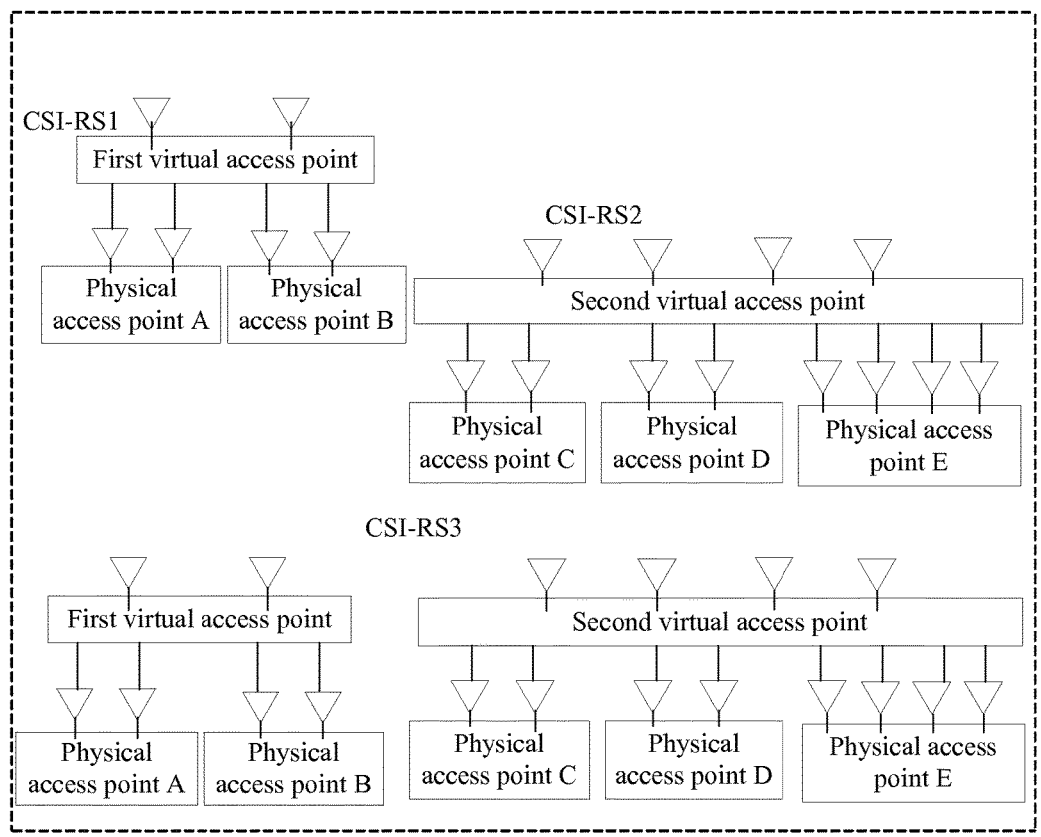
FIG. 5 is a schematic diagram of a second scenario where the method of the present invention is applied to a joint multi-point transmission system.

FIG. 5 is a schematic diagram of a second scenario where the method of the present invention is applied to a joint multi-point transmission system. In this embodiment, the CSI-RS pilot patterns are virtual access point CSI-RS pilot patterns. Refer to the embodiment of FIG. 3 for the same part between this embodiment and the embodiment of FIG. 3, and details will not be described herein again.

As shown in FIG. 5, a difference between this embodiment and the embodiment of FIG. 3 merely lies in that, the base station virtualizes physical access points that serve a user equipment UE into virtual access points, and divides the virtual access points into a first virtual access point set and a second virtual access point set. Specifically, as shown in FIG. 5, a physical access point A and a physical access point B are virtualized into a virtual access point 1, a physical access point C, a physical access point D, and a physical access point E are virtualized into a virtual access point 2, and the virtual access points are divided into the first virtual access point set and the second virtual access point set. That is to say, the first virtual access point set in FIG. 5 includes the virtual access point 1, which has two virtual antenna ports and is formed by virtualizing the physical access point A and the physical access point B, and the two virtual antenna ports of the virtual access point 1 are mapped to four physical antenna ports of the physical access point A and the physical access point B; and the second virtual access point set includes the virtual access point 2, which has four virtual antenna ports and is formed by virtualizing the physical access point A, the physical access point B, and the physical access point C, and the four antenna ports of the virtual access point 2 are mapped to eight physical antenna ports of the physical access point C, the physical access point D and the physical access point E.

Specifically, the base station configures a 2-port first CSI-RS pilot pattern {A0, A1} for the UE, and configures the first CSI-RS pilot pattern to the virtual antenna ports of the first virtual access point set; configures a 4-port second CSI-RS pilot pattern {B0, B1, B2, B3} for the UE, and configures the second CSI-RS pilot pattern to the virtual antenna ports of the second virtual access point set; configures a 2-port third CSI-RS pilot pattern {C0, C1} for the UE, where the third CSI-RS pilot pattern includes a CSI-RS pilot pattern {C0, C1} with an antenna port number of 2, and configures the third CSI-RS pilot pattern to a first virtual antenna port of the first virtual access point set and a second virtual antenna port of the second virtual access point set.

In this embodiment, the present invention is described by using the first virtual access point set and the second virtual access point set respectively as one virtual access point, but the present invention is not limited thereto. In another possible implementation manner, the physical access points may be virtualized into multiple virtual access points, and the multiple virtual access points are divided into a first virtual access point set and a second virtual access point set, where each virtual access point may have multiple virtual access points.

Figure 6:
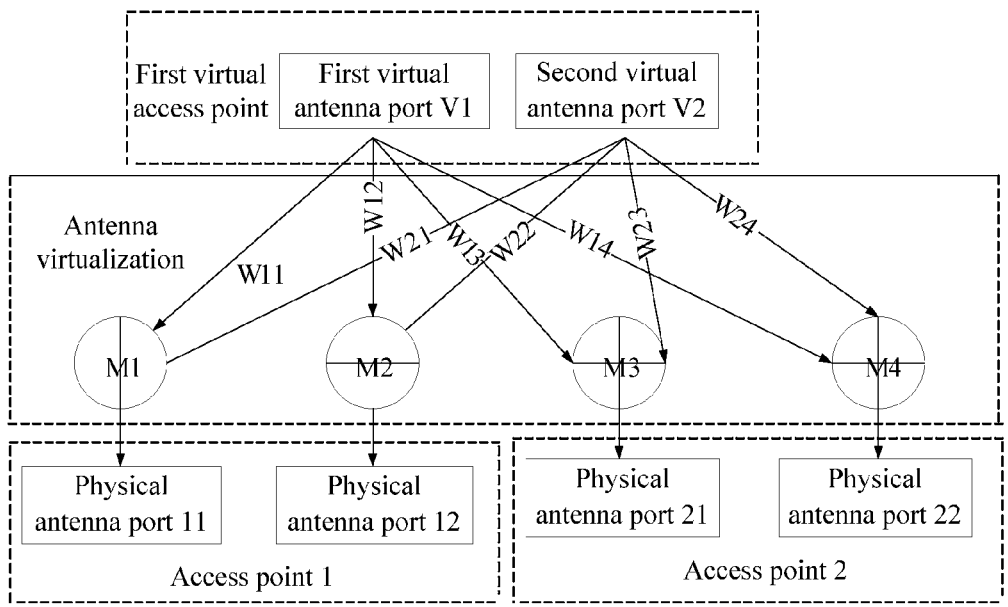
FIG. 6 is a schematic simulation diagram of virtualizing an access point in a first access point set in an embodiment of FIG. 5 into a virtual access point 1.

FIG. 6 is a schematic simulation diagram of virtualizing the access points in the first access point set in the embodiment of FIG. 5 into a virtual access point 1. As shown in FIG. 6, after antenna virtualization by using multipliers W11, W12, W13, and W14 and adders M1, M2, M3, and M4, a first virtual antenna port V1 is mapped to physical antenna ports of the access points in the first access point set, that is, a first physical port 11 and a second physical port 12 of the physical access point A and a first physical port 21 and a second physical port 22 of the physical access point B.

Similarly, after antenna virtualization by using multipliers W21, W22, W23, and W24 and adders M1, M2, M3, and M4, a second virtual antenna port V2 of the virtual access point 1 is mapped to the physical antenna ports of the access points in the first access point set, that is, the first physical port 11 and the second physical port 12 of the physical access point A and the first physical port 21 and the second physical port 22 of the access point B.

Figure 7:
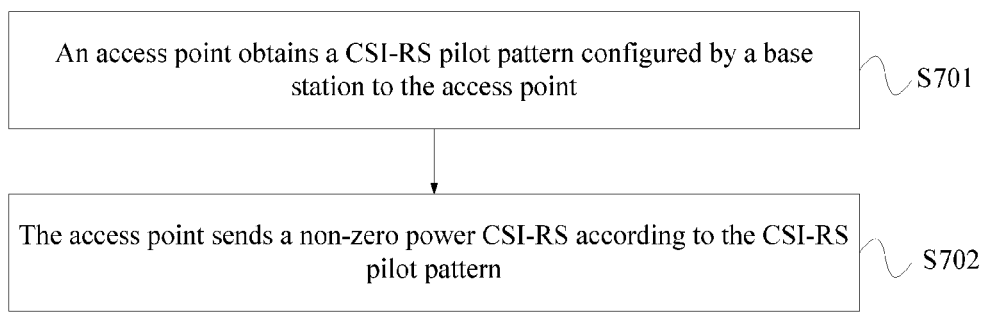
FIG. 7 is a schematic flowchart of a method for configuring a channel state information reference signal according to Embodiment 5 of the present invention.

FIG. 7 is a schematic flowchart of a method for configuring a channel state information reference signal according to Embodiment 5 of the present invention. In this embodiment, an access point sends a non-zero power CSI-RS according to a pilot pattern configured by a base station. As shown in FIG. 7, the method for configuring a channel state information reference signal CSI-RS includes the following steps.

Step S701: An access point obtains a CSI-RS pilot pattern configured by a base station to the access point.

In this step, the CSI-RS pilot pattern is one of a first CSI-RS pilot pattern, a second CSI-RS pilot pattern, or a third CSI-RS pilot pattern, which are configured by the base station to a user equipment UE. The first CSI-RS pilot pattern is an X-port CSI-RS pilot pattern, the X-port CSI-RS pilot pattern includes M CSI-RS pilot patterns which respectively have a port number of Jm, Jm is an antenna port number of an $m^{th}$ access point in the first access point set, m=1, . . . M, and X is a sum of antenna port numbers of M access points in the first access point set. The second CSI-RS pilot pattern is a Y-port CSI-RS pilot pattern, the Y-port CSI-RS pilot pattern includes N CSI-RS pilot patterns which respectively have a port number of Gn, Gn is an antenna port number of an $n^{th}$ access point in the second access point set, n=1, . . . N, and Y is a sum of antenna port numbers of N access points in the second access point set. The third CSI-RS pilot pattern is a 2-port CSI-RS pilot pattern, which includes a CSI-RS pilot pattern with a port number of 2.

Step S702: The access point sends a non-zero power CSI-RS according to the CSI-RS pilot pattern.

Using FIG. 4A to FIG. 4E as examples, the physical access point 1 obtains the 2-port pilot pattern {A0, A1} in the first CSI-RS pilot pattern, which is configured by the base station to the first access point set, the physical access point 2 obtains the pilot pattern {A2, A3}, the physical access point 3 obtains the pilot pattern {B0, B1}, the physical access point 4 obtains the pilot pattern {B2, B3}, the physical access point 5 obtains the pilot pattern {B4, B5, B6, B7}, and the antenna set formed by the first antenna of the physical access point 1 and the first antenna of the physical access point 2 obtains the pilot pattern {C0, C1}.

After obtaining the respective pilot pattern, each access point sends a non-zero power CSI-RS according to the CSI-RS pilot pattern.

It should be noted that, the pilot patterns shown in FIG. 4A to FIG. 4E are merely exemplary, and allocation may be performed in another manner, so that each access point obtains a pilot pattern. For example, because of a different configuration manner, the physical access point 3 may obtain the pilot pattern {B4, B5}, the physical access point 4 may obtain the pilot pattern {B6, B7}, and the physical access point 5 obtains the pilot pattern {B0, B1, B2, B3}, and the like.

In this embodiment, the access points obtain respective pilot patterns, to identify CSI-RSs of multiple access points, thereby implementing measurement of the downlink channel state information of multiple access points.

The above embodiments are based on a normal cyclic prefix, but the present invention is not limited thereto. Reference may be made to the embodiments of the present invention when the embodiments are based on an extended cyclic prefix.

Figure 8:
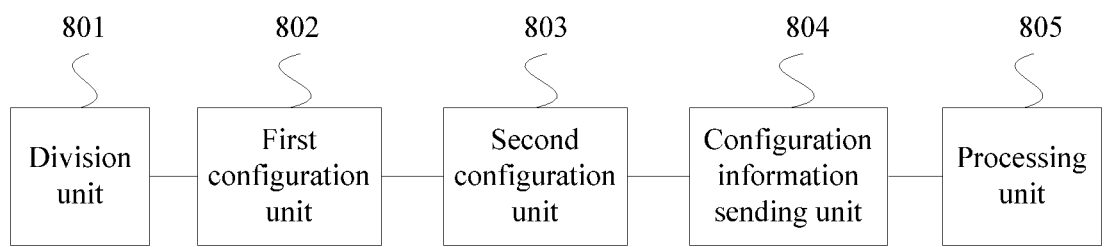
FIG. 8 is a schematic structural diagram of a base station according to Embodiment 1 of the present invention.

FIG. 8 is a schematic structural diagram of a base station according to Embodiment 1 of the present invention. As shown in FIG. 8, the base station provided by this embodiment includes: a division unit 801, a first configuration unit 802, a second configuration unit 803, a configuration information sending unit 804, and a processing unit 805.

The division unit 801 is adapted to divide multiple access points of coordinated transmission into a first access point set and a second access point set, where the first access point set includes M access points, and the second access point set includes N access points.

The first configuration unit 802, connected to the division unit 801, is adapted to configure a first CSI-RS pilot pattern, a second CSI-RS pilot pattern, and a third CSI-RS pilot pattern for a user equipment UE, where the first CSI-RS pilot pattern is an X-port CSI-RS pilot pattern, the X-port CSI-RS pilot pattern includes M CSI-RS pilot patterns which respectively have a port number of Jm, Jm is an antenna port number of an $m^{th}$ access point in the first access point set, m=1, . . . M, and X is a sum of antenna port numbers of the M access points in the first access point set; the second CSI-RS pilot pattern is a Y-port CSI-RS pilot pattern, the Y-port CSI-RS pilot pattern includes N CSI-RS pilot patterns which respectively have a port number of Gn, Gn is an antenna port number of an $n^{th}$ access point in the second access point set, n=1, . . . N, and Y is a sum of antenna port numbers of the N access points in the second access point set; and the third CSI-RS pilot pattern is a 2-port CSI-RS pilot pattern, which includes a CSI-RS pilot pattern with a port number of 2.

The second configuration unit 803, connected to the first configuration unit 802, is adapted to respectively configure the first CSI-RS pilot pattern, the second CSI-RS pilot pattern, and the third CSI-RS pilot pattern to the first access point set, the second access point set, and an antenna set formed by a first antenna of the first access point set and a first antenna of the second access point set, so that each access point in the first access point set sends a first non-zero power CSI-RS according to the first CSI-RS pilot pattern, each access point in the second access point set sends a second non-zero power CSI-RS according to the second CSI-RS pilot pattern, and the antenna set sends a third non-zero power CSI-RS according to the third CSI-RS pilot pattern.

The configuration information sending unit 804 is adapted to send non-zero power CSI-RS configuration information to the UE, where the configuration information includes the first CSI-RS pilot pattern, the second CSI-RS pilot pattern, and the third CSI-RS pilot pattern, so that the UE measures and reports first downlink channel state information according to the first CSI-RS pilot pattern, measures and reports second downlink channel state information according to the second CSI-RS pilot pattern, and measures and reports third downlink channel state information according to the third CSI-RS pilot pattern.

The processing unit 805 is adapted to generate joint downlink channel state information according to the first downlink channel state information, the second downlink channel state information, and the third downlink channel state information, which are reported by the UE.

The device of this embodiment is used to execute the above technical solutions of Embodiment 1 of the method shown in FIG. 1, implementation principles and technical effects thereof are similar, and details will not be described herein again.

In another embodiment of the present invention, the second configuration unit 803 is specifically adapted to respectively configure a CSI-RS pilot pattern with a port number of Jm to an $m^{th}$ access point in the first access point set, configure a CSI-RS pilot pattern with a port number of Gn to an $n^{th}$ access point in the second access point set, and configure a CSI-RS pilot pattern with a port of 2 to a first antenna of the first access point set and a second antenna of the second access point set, so that the $m^{th}$ access point in the first access point set sends the first non-zero power CSI-RS on the CSI-RS pilot pattern with the port number of Jm, the $n^{th}$ access point in the second access point set sends the second non-zero power CSI-RS on the CSI-RS pilot pattern with the port number of Gn, and the first antenna of the first access point set and the first antenna of the second access point set send the third non-zero power CSI-RS on the 2-port CSI-RS pilot pattern.

Specifically, refer to the above technical solutions of Embodiment 3 of the method, implementation principles and technical effects thereof are similar, and details will not be described herein again.

Figure 9:
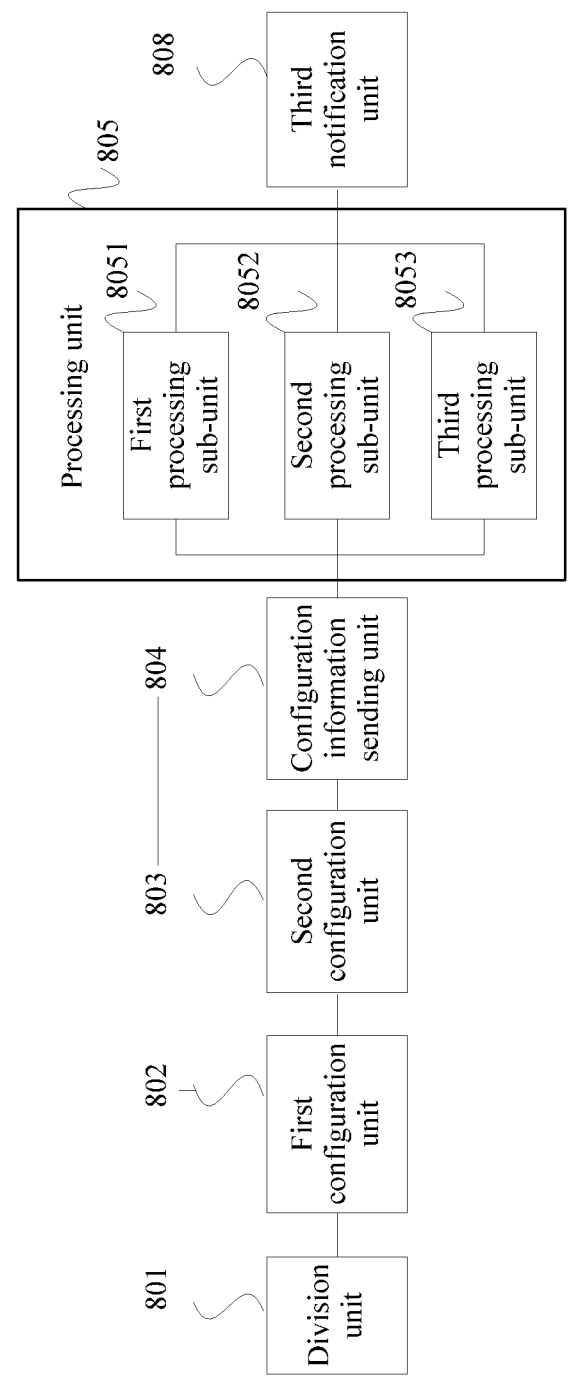
FIG. 9 is a schematic structural diagram of a base station according to Embodiment 2 of the present invention.

FIG. 9 is a schematic structural diagram of a base station according to Embodiment 2 of the present invention. As shown in FIG. 9, the base station is based on the structure shown in FIG. 8, and the processing unit 805 further includes: a first processing sub-unit 8051, a second processing sub-unit 8052, and a third processing sub-unit 8053.

The first processing sub-unit 8051 is adapted to respectively obtain a first precoding matrix of the first downlink channel state information, a second precoding matrix of the second downlink channel state information, and a third precoding matrix of the third downlink channel state information according to the first downlink channel state information, the second downlink channel state information, and the third downlink channel state information, which are reported by a user equipment UE.

The second processing sub-unit 8052 is adapted to determine first rank indication information of the first downlink channel state information and second rank indication information of the second downlink channel state information.

The third processing sub-unit 8053, respectively connected to the first processing sub-unit 8051 and the second processing sub-unit 8052, is adapted to generate a joint precoding matrix of the joint downlink channel state information according to the first precoding matrix, the second precoding matrix, the third precoding matrix, the first rank indication information, and the second rank indication information.

Specifically, the third processing sub-unit 8053 uses a minimum value of the first rank indication information and the second rank indication information as joint rank indication information of the joint downlink channel state information, and applies the following formula to calculate the joint precoding matrix $P_{joint}$ of the joint downlink channel state information:

$$P_{joint}\begin{bmatrix} p_{31} \times P1(:, 1:RI_{joint}) \\ p_{32} \times P2(:, 1:RI_{joint}) \end{bmatrix};$$

where $P1(:,1:RI_{joint})$ denotes column 1 to column $RI_{joint}$ of the first precoding matrix P1, $P2(:,1:RI_{joint})$ denotes column 1 to column $RI_{joint}$ of the second precoding matrix P2, and $p_{31}$ and $p_{32}$ respectively denote two elements of the third precoding matrix P3.

Further, the base station of this embodiment may further include a third notification unit 808, adapted to notify the UE of at least one of a mapping between ports of the first CSI-RS pilot pattern and elements of the first precoding matrix, a mapping between ports of the second CSI-RS pilot pattern and elements of the second precoding matrix, and a mapping between ports of the third CSI-RS pilot pattern and elements of the third precoding matrix.

The base station of this embodiment is used to execute the above technical solutions of Embodiment 2 of the method shown in FIG. 2, implementation principles and technical effects thereof are similar, and details will not be described herein again.

Figure 10:
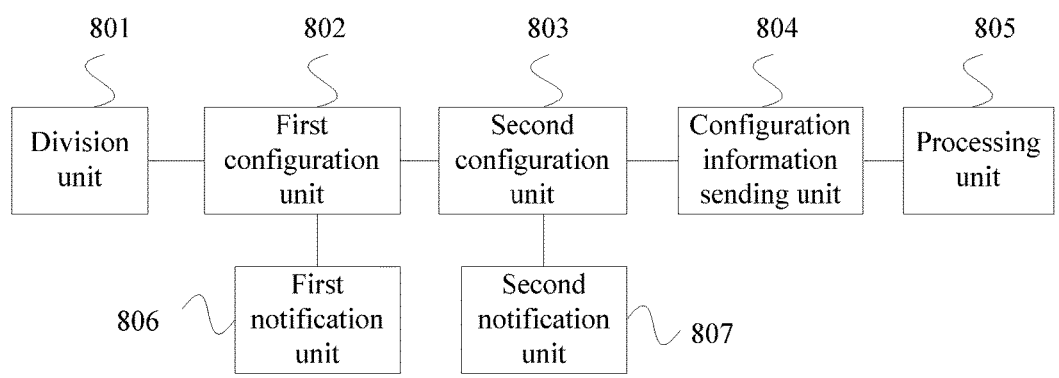
FIG. 10 is a schematic structural diagram of a base station according to Embodiment 3 of the present invention.

FIG. 10 is a schematic structural diagram of a base station according to Embodiment 3 of the present invention. As shown in FIG. 10, the base station is based on the structure shown in FIG. 8, and in addition to the division unit 801, the first configuration unit 802, the second configuration unit 803, the configuration information sending unit 804, and the processing unit 805, the base station further includes a first notification unit 806 and a second notification unit 807.

The first notification unit 806, connected to the first configuration unit 802, is adapted to notify an $m^{th}$ access point in the first access point set of a CSI-RS pilot pattern that corresponds to an $x^{th}$ access point in the first access point set and has a port number of Jx, so that the $m^{th}$ access point sends a zero power CSI-RS on the CSI-RS pilot pattern with the port number of Jx, where interference exists between the $x^{th}$ access point and the $m^{th}$ access point, and x≠m.

The second notification unit 807, connected to the second configuration unit 803, is adapted to notify an $n^{th}$ access point in the second access point set of a CSI-RS pilot pattern that corresponds to a $y^{th}$ access point in the second access point set and has a port number of Gy, so that the $n^{th}$ access point sends a zero power CSI-RS on the CSI-RS pilot pattern with the port number of Gy, where interference exists between the $y^{th}$ access point and the $n^{th}$ access point, and y≠n.

The base station of this embodiment is used to execute the above technical solutions of Embodiment 4 of the method, implementation principles and technical effects thereof are similar, and details will not be described herein again.

Figure 11:
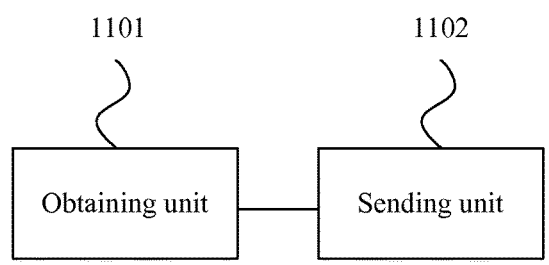
FIG. 11 is a schematic structural diagram of an access point according to Embodiment 1 of the present invention.

FIG. 11 is a schematic structural diagram of an access point according to Embodiment 1 of the present invention. As shown in FIG. 11, the access point includes: an obtaining unit 1101 and a sending unit 1102.

The obtaining unit 1101 is adapted to obtain a CSI-RS pilot pattern configured by a base station to the access point, where the CSI-RS pilot pattern is one of a first CSI-RS pilot pattern, a second CSI-RS pilot pattern, or a third CSI-RS pilot pattern, which are configured by the base station for a user equipment UE. The CSI-RS pilot pattern is an X-port CSI-RS pilot pattern, the X-port CSI-RS pilot pattern includes M CSI-RS pilot patterns which respectively have a port number of Jm, Jm is an antenna port number of an $m^{th}$ access point in the first access point set, m=1, ... M, and X is a sum of antenna port numbers of M access points in the first access point set. The second CSI-RS pilot pattern is a Y-port CSI-RS pilot pattern, the Y-port CSI-RS pilot pattern includes N CSI-RS pilot patterns which respectively have a port number of Gn, Gn is an antenna port number of an $n^{th}$ access point in the second access point set, n=1, ... N, and Y is a sum of antenna port numbers of N access points in the second access point set. The third CSI-RS pilot pattern is a 2-port CSI-RS pilot pattern, which includes a CSI-RS pilot pattern with a port number of 2.

The sending unit 1102, connected to the obtaining unit 1101, is adapted to send a non-zero power CSI-RS according to the CSI-RS pilot pattern.

The access point of this embodiment is used to execute the above technical solutions of Embodiment 5 of the method shown in FIG. 4, implementation principles and technical effects thereof are similar, and details will not be described herein again.

In the method for configuring a channel state information reference signal, the base station, and the access point provided by the embodiments of the present invention, a base station divides access points that provide services for a UE into a first access point set and a second access point set, configures a first CSI-RS pilot pattern, a second CSI-RS pilot pattern, and a third CSI-RS pilot pattern for the UE, allocates the patterns to the first access point set, the second access point set, and an antenna set formed by a first antenna of a first access point in the first access point set and a first antenna of a first access point in the second access point set, and sends non-zero power CSI-RS configuration information including the pilot patterns to the UE. The UE measures and reports first downlink channel state information of the first access point set, second downlink channel state information of the second access point set, and third downlink channel state information of the antenna set according to the pilot patterns, so that the base station or a network side entity can obtain joint downlink channel state information according to the first downlink channel state information, the second downlink channel state information, and the third downlink channel state information. In the embodiments, the base station configures CSI-RS pilot patterns for multiple access points that are coordinated, so that the UE can measure and report joint downlink channel state information of at least three access points.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, as long as such modifications or replacements do not cause the essence of corresponding technical solutions to depart from the scope of the technical solutions of the embodiments of the present invention.

What is claimed is:

1. A method for configuring a channel state information reference signal, the method comprising:
   dividing multiple access points of coordinated transmission into a first access point set and a second access point set, wherein the first access point set comprises M access points and the second access point set comprises N access points;
   configuring a first channel state information reference signal (CSI-RS) pilot pattern, a second CSI-RS pilot pattern, and a third CSI-RS pilot pattern for a user equipment (UE), wherein the first CSI-RS pilot pattern is an X-port CSI-RS pilot pattern, the X-port CSI-RS pilot pattern comprising M CSI-RS pilot patterns that respectively have a port number of Jm, where Jm is an antenna port number of an $m^{th}$ access point in the first access point set, m=1, ... M, and X is a sum of antenna port numbers of the M access points in the first access point set, wherein the second CSI-RS pilot pattern is a Y-port CSI-RS pilot pattern, the Y-port CSI-RS pilot pattern comprising N CSI-RS pilot patterns that respectively have a port number of Gn, where Gn is an antenna port number of an $n^{th}$ access point in the second access point set, n=1, ... N, and Y is a sum of antenna port numbers of the N access points in the second access point set; and wherein the third CSI-RS pilot pattern is a 2-port CSI-RS pilot pattern, which comprises a CSI-RS pilot pattern with an antenna port number of 2;
   configuring the first CSI-RS pilot pattern to the first access point set, the second CSI-RS pilot pattern to the second access point set, and the third CSI-RS pilot pattern to an antenna set formed by a first antenna of the first access point set and a first antenna of the second access point set, so that each access point in the first access point set sends a first non-zero power CSI-RS according to the first CSI-RS pilot pattern, each access point in the second access point set sends a second non-zero power CSI-RS according to the second CSI-RS pilot pattern, and the antenna set sends a third non-zero power CSI-RS according to the third CSI-RS pilot pattern;
   sending non-zero power CSI-RS configuration information to the UE, wherein the configuration information comprises the first CSI-RS pilot pattern, the second CSI-RS pilot pattern, and the third CSI-RS pilot pattern;
   receiving, from the UE and based on a measurement of the UE, first downlink channel state information according to the first CSI-RS pilot pattern, second downlink channel state information according to the second CSI-RS pilot pattern, and third downlink channel state information according to the third CSI-RS pilot pattern; and
   generating joint downlink channel state information according to the first downlink channel state information, the second downlink channel state information, and the third downlink channel state information, which are received from the UE.

2. The method according to claim 1, wherein generating the joint downlink channel state information according to the first downlink channel state information, the second downlink channel state information, and the third downlink channel state information comprises:
   respectively obtaining a first precoding matrix of the first downlink channel state information according to the first downlink channel state information, a second precoding matrix of the second downlink channel state information according to the second downlink channel state information, and a third precoding matrix of the third downlink channel state information according the third downlink channel state information;
   determining first rank indication information of the first downlink channel state information and second rank indication information of the second downlink channel state information; and
   generating a joint precoding matrix of the joint downlink channel state information according to the first precoding matrix, the second precoding matrix, the third precoding matrix, the first rank indication information, and the second rank indication information.

3. The method according to claim 2, wherein generating the joint precoding matrix of the joint downlink channel state information comprises:
   using a minimum value of the first rank indication information and the second rank indication information as joint rank indication information of the joint downlink channel state information; and
   applying the following formula to calculate the joint precoding matrix $P_{joint}$ of the joint downlink channel state information:

$$P_{joint}\begin{bmatrix} p_{31} \times P1(:,1:RI_{joint}) \\ p_{32} \times P2(:,1:RI_{joint}) \end{bmatrix},$$

where $P1(:,1:RI_{joint})$ denotes column 1 to column $RI_{joint}$ of the first precoding matrix P1, $P2(:,1:RI_{joint})$ denotes column 1 to column $RI_{joint}$ of the second precoding matrix P2, and $p_{31}$ and $p_{32}$ respectively denote two elements of the third precoding matrix P3.

4. The method according to claim 1, wherein configuring the first, second and third CSI-RS pilot patterns comprises configuring a CSI-RS pilot pattern with a port number of Jm to an $m^{th}$ access point in the first access point set, configuring a CSI-RS pilot pattern with a port number of Gn to an $n^{th}$ access point in the second access point set, and configuring a CSI-RS pilot pattern with a port of 2 to the first antenna of the first access point set and a second antenna of the second access point set, so that the $m^{th}$ access point in the first access point set sends the first non-zero power CSI-RS on the CSI-RS pilot pattern with the port number of Jm, the $n^{th}$ access point in the second access point set sends the second non-zero power CSI-RS on the CSI-RS pilot pattern with the port number of Gn, and the first antenna of the first access point set and the first antenna of the second access point set send the third non-zero power CSI-RS on the 2-port CSI-RS pilot pattern.

5. The method according to claim 4, wherein, after configuring the first CSI-RS pilot pattern, the second CSI-RS pilot pattern, and the third CSI-RS pilot pattern for the UE, the method further comprises notifying the $m^{th}$ access point in the first access point set of a CSI-RS pilot pattern that corresponds to an $x^{th}$ access point in the first access point set and has a port number of Jx, so that the $m^{th}$ access point sends a zero power CSI-RS on the CSI-RS pilot pattern with the port number of Jx, wherein x≠m.

6. The method according to claim 4, wherein, after configuring the first CSI-RS pilot pattern, the second CSI-RS pilot pattern, and the third CSI-RS pilot pattern for the UE, the method further comprises notifying the $n^{th}$ access point in the second access point set of a CSI-RS pilot pattern that corresponds to a $y^{th}$ access point in the second access point set and has a port number of Gy, so that the $n^{th}$ access point sends a zero power CSI-RS on the CSI-RS pilot pattern with the port number of Gy, wherein y≠n.

7. The method according to claim 2, further comprising notifying the UE of at least one of a mapping between ports of the first CSI-RS pilot pattern and elements of the first precoding matrix, a mapping between ports of the second CSI-RS pilot pattern and elements of the second precoding matrix, and a mapping between ports of the third CSI-RS pilot pattern and elements of the third precoding matrix.

8. The method for according to claim 1, wherein a cycle of the second CSI-RS pilot pattern is larger than a cycle of the first CSI-RS pilot pattern and/or a cycle of the third CSI-RS pilot pattern.

9. The method according to claim 1, wherein the access points are physical access points or virtual access points, the antennas are physical antennas or virtual antennas, and the antenna ports are physical antenna ports or virtual antenna ports.

10. A method for configuring a channel state information reference signal, the method comprising:
obtaining, by an access point, a CSI-RS pilot pattern configured by a base station to the access point, wherein the CSI-RS pilot pattern is one of a first CSI-RS pilot pattern, a second CSI-RS pilot pattern or a third CSI-RS pilot pattern, which are configured by the base station for a user equipment UE, wherein the first CSI-RS pilot pattern is an X-port CSI-RS pilot pattern, the X-port CSI-RS pilot pattern comprising M CSI-RS pilot patterns which respectively have a port number of Jm, Jm being an antenna port number of an $m^{th}$ access point in a first access point set, where m=1, . . . M, and X is a sum of antenna port numbers of M access points in the first access point set, wherein the second CSI-RS pilot pattern is a Y-port CSI-RS pilot pattern, the Y-port CSI-RS pilot pattern comprising N CSI-RS pilot patterns which respectively have a port number of Gn, Gn is an antenna port number of an $n^{th}$ access point in the second access point set, n=1, . . . N, and Y is a sum of antenna port numbers of N access points in the second access point set, and wherein the third CSI-RS pilot pattern is a 2-port CSI-RS pilot pattern, which comprises a CSI-RS pilot pattern with an antenna port number of 2; and
sending, by the access point, a non-zero power CSI-RS according to the CSI-RS pilot pattern.

11. A base station, comprising:
a division unit, adapted to divide multiple access points of coordinated transmission into a first access point set and a second access point set, wherein the first access point set comprises M access points, and the second access point set comprises N access points;
a first configuration unit, adapted to configure a first CSI-RS pilot pattern, a second CSI-RS pilot pattern, and a third CSI-RS pilot pattern for a user equipment UE, wherein the first CSI-RS pilot pattern is an X-port CSI-RS pilot pattern, the X-port CSI-RS pilot pattern comprises M CSI-RS pilot patterns which respectively have a port number of Jm, Jm being an antenna port number of an $m^{th}$ access point in the first access point set, where m=1, . . . M, and X is a sum of antenna port numbers of the M access points in the first access point set, wherein the second CSI-RS pilot pattern is a Y-port CSI-RS pilot pattern, the Y-port CSI-RS pilot pattern comprising N CSI-RS pilot patterns which respectively have a port number of Gn, where Gn is an antenna port number of an $n^{th}$ access point in the second access point set, n=1, . . . N, and Y is a sum of antenna port numbers of the N access points in the second access point set, and wherein the third CSI-RS pilot pattern is a 2-port CSI-RS pilot pattern, which comprises a CSI-RS pilot pattern with an antenna port number of 2;
a second configuration unit, adapted to respectively configure the first CSI-RS pilot pattern, the second CSI-RS pilot pattern, and the third CSI-RS pilot pattern to the first access point set, the second access point set, and an antenna set formed by a first antenna of the first access point set and a first antenna of the second access point set, so that each access point in the first access point set sends a first non-zero power CSI-RS according to the first CSI-RS pilot pattern, each access point in the second access point set sends a second non-zero power CSI-RS according to the second CSI-RS pilot pattern, and the antenna set sends a third non-zero power CSI-RS according to the third CSI-RS pilot pattern;
a configuration information sending unit, adapted to send non-zero power CSI-RS configuration information to the UE, wherein the configuration information comprises the first CSI-RS pilot pattern, the second CSI-RS pilot pattern, and the third CSI-RS pilot pattern, so that the UE can measure and report first downlink channel state information according to the first CSI-RS pilot pattern, measure and report second downlink channel state information according to the second CSI-RS pilot pattern, and measure and report third downlink channel state information according to the third CSI-RS pilot pattern; and
a processing unit, adapted to generate joint downlink channel state information according to the first downlink channel state information, the second downlink channel state information, and the third downlink channel state information, which are reported by the UE.

12. The base station according to claim 11, wherein the processing unit comprises:
a first processing sub-unit, adapted to respectively obtain a first precoding matrix of the first downlink channel state information, a second precoding matrix of the second downlink channel state information, and a third precoding matrix of the third downlink channel state information according to the first downlink channel state information, the second downlink channel state information, and the third downlink channel state information, which are reported by the UE;
a second processing sub-unit, adapted to determine first rank indication information of the first downlink channel state information and second rank indication information of the second downlink channel state information; and
a third processing sub-unit, respectively connected to the first processing sub-unit and the second processing sub-unit, adapted to generate a joint precoding matrix of the joint downlink channel state information according to the first precoding matrix, the second precoding matrix, the third precoding matrix, the first rank indication information, and the second rank indication information.

13. The base station according to claim 12, wherein the third processing sub-unit is adapted to use a minimum value of the first rank indication information and the second rank indication information as joint rank indication information of the joint downlink channel state information, and apply the following formula to calculate the joint precoding matrix $P_{joint}$ of the joint downlink channel state information:

$$P_{joint}\begin{bmatrix} p_{31} \times P1(:,1:RI_{joint}) \\ p_{32} \times P2(:,1:RI_{joint}) \end{bmatrix},$$

wherein $P1(:,1:RI_{joint})$ denotes column 1 to column $RI_{joint}$ of the first precoding matrix P1, $P2(:,1:RI_{joint})$ denotes column 1 to column $RI_{joint}$ of the second precoding matrix P2, and $p_{31}$ and $p_{32}$ respectively denote two elements of the third precoding matrix P3.

14. The base station according to claim 11, wherein the second configuration unit is adapted to respectively configure a CSI-RS pilot pattern with a port number of Jm to an $m^{th}$ access point in the first access point set, configure a CSI-RS pilot pattern with a port number of Gn to an $n^{th}$ access point in the second access point set, and configure a CSI-RS pilot pattern with a port of 2 to the first antenna of the first access point set and a second antenna of the second access point set, so that the $m^{th}$ access point in the first access point set sends the first non-zero power CSI-RS on the CSI-RS pilot pattern with the port number of Jm, the $n^{th}$ access point in the second access point set sends the second non-zero power CSI-RS on the CSI-RS pilot pattern with the port number of Gn, and the first antenna of the first access point set and the first antenna of the second access point set send the third non-zero power CSI-RS on the 2-port CSI-RS pilot pattern.

15. The base station according to claim 14, further comprising a first notification unit, adapted to notify the $m^{th}$ access point in the first access point set of a CSI-RS pilot pattern that corresponds to an $x^{th}$ access point in the first access point set and has a port number of Jx, so that the $m^{th}$ access point sends a zero power CSI-RS on the CSI-RS pilot pattern with the port number of Jx, wherein x≠m.

16. The base station according to claim 14, further comprising a second notification unit, adapted to notify the $n^{th}$ access point in the second access point set of a CSI-RS pilot pattern that corresponds to a $y^{th}$ access point in the second access point set and has a port number of Gy, so that the $n^{th}$ access point sends a zero power CSI-RS on the CSI-RS pilot pattern with the port number of Gy, wherein y≠n.

17. The base station according to claim 12, further comprising a third notification unit, adapted to notify the UE of at least one of a mapping between ports of the first CSI-RS pilot pattern and elements of the first precoding matrix, a mapping between ports of the second CSI-RS pilot pattern and elements of the second precoding matrix, and a mapping between ports of the third CSI-RS pilot pattern and elements of the third precoding matrix.

18. The base station according to claim 11, wherein the access points are physical access points or virtual access points, the antennas are physical antennas or virtual antennas, and the antenna ports are physical antenna ports or virtual antenna ports.

19. An access point, comprising:
an obtaining unit, adapted to obtain a channel state information reference signal CSI-RS pilot pattern configured by a base station to the access point, wherein the CSI-RS pilot pattern is one of a first CSI-RS pilot pattern, a second CSI-RS pilot pattern, or a third CSI-RS pilot pattern, which are configured by the base station for a user equipment UE, the CSI-RS pilot pattern is an X-port CSI-RS pilot pattern, the X-port CSI-RS pilot pattern comprises M CSI-RS pilot patterns which respectively have a port number of Jm, Jm is an antenna port number of an $m^{th}$ access point in a first access point set, m=1, . . . M, and X is a sum of port numbers of M access points in the first access point set; the second CSI-RS pilot pattern is a Y-port CSI-RS pilot pattern, the Y-port CSI-RS pilot pattern comprises N CSI-RS pilot patterns which respectively have a port number of Gn, Gn is an antenna port number of an $n^{th}$ access point in a second access point set, n=1, . . . N, and Y is a sum of antenna port numbers of N access points in the second access point set; and the third CSI-RS pilot pattern is a 2-port CSI-RS pilot pattern, which comprises a CSI-RS pilot pattern with a port number of 2; and
a sending unit, connected to the obtaining unit, adapted to send a non-zero power CSI-RS according to the CSI-RS pilot pattern.

* * * * *